United States Patent
Ma et al.

(10) Patent No.: US 12,009,514 B2
(45) Date of Patent: *Jun. 11, 2024

(54) PEROVSKITE MATERIAL, METHOD OF PREPARING THE SAME, AND SECONDARY BATTERY INCLUDING THE PEROVSKITE MATERIAL

(71) Applicant: Samsung Electronics Co., Ltd., Suwon-si (KR)

(72) Inventors: Sangbok Ma, Suwon-si (KR); Hyukjae Kwon, Suwon-si (KR); Hyunpyo Lee, Seoul (KR); Donghwa Seo, Burlington, MA (US); Dongmin Im, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 888 days.

This patent is subject to a terminal disclaimer.

(21) Appl. No.: 16/587,116

(22) Filed: Sep. 30, 2019

(65) Prior Publication Data

US 2020/0119346 A1 Apr. 16, 2020

Related U.S. Application Data

(60) Provisional application No. 62/744,614, filed on Oct. 11, 2018.

(30) Foreign Application Priority Data

Oct. 12, 2018 (KR) .................. 10-2018-0122041

(51) Int. Cl.
*H01M 4/485* (2010.01)
*C01G 37/00* (2006.01)
(Continued)

(52) U.S. Cl.
CPC .......... *H01M 4/485* (2013.01); *C01G 37/006* (2013.01); *C01G 45/1264* (2013.01);
(Continued)

(58) Field of Classification Search
CPC . H01M 4/485; C01G 37/006; C01G 45/1264; C01G 51/70; C01G 53/70;
(Continued)

(56) References Cited

U.S. PATENT DOCUMENTS

2006/0254677 A1   11/2006   McKinnell et al.
2013/0162109 A1*  6/2013   Hatano ............... H01L 41/1873
                                              252/62.9 PZ
(Continued)

FOREIGN PATENT DOCUMENTS

CN    108206277 A   *   6/2018   ........ H01M 10/0525
CN    108475765 A        8/2018
(Continued)

OTHER PUBLICATIONS

English machine translation of Du et al. (CN 108206277 A) (Year: 2018).*

(Continued)

*Primary Examiner* — Stewart A Fraser
(74) *Attorney, Agent, or Firm* — CANTOR COLBURN LLP

(57) ABSTRACT

A perovskite material represented by Formula 1:

$$Li_xA_yM_zO_{3-\delta}$$  Formula 1 wherein in Formula 1, $0<x\leq 1$, $0<y\leq 1$, $0<x+y<1$, $0<z\leq 1.5$, $0\leq\delta\leq 1$, A is H, Na, K, Rb, Cs, Ca, Sr, Ba, Y, La, Ce, Pr, Nd, Pm, Sm, Gd, Tb, Dy, Ho, Er, or a combination thereof, and M is Ni, Pd, Pb, Fe, Ir, Co, Rh, Mn, Cr, Ru, Re, Sn, V, Ge, W, Zr, Mo, Hf, U, Nb, Th, Ta, Bi, Li, H, Na, K, Rb, Cs, Ca, Sr, Ba, Y, La, Ce, Pr, Nd, Pm, Sm,
(Continued)

Gd, Tb, Dy, Ho, Er, Mg, Al, Si, Sc, Zn, Ga, Ag, Cd, In, Sb, Pt, Au, or a combination thereof.

31 Claims, 7 Drawing Sheets

(51) Int. Cl.
    *C01G 45/12*         (2006.01)
    *C01G 51/00*         (2006.01)
    *C01G 53/00*         (2006.01)
    *C01G 55/00*         (2006.01)

(52) U.S. Cl.
    CPC ............. *C01G 51/70* (2013.01); *C01G 53/70* (2013.01); *C01G 55/002* (2013.01); *C01P 2002/34* (2013.01); *C01P 2002/72* (2013.01); *C01P 2006/40* (2013.01)

(58) Field of Classification Search
    CPC ............... C01G 55/002; C01P 2002/34; C01P 2002/72; C01P 2006/40
    See application file for complete search history.

(56) References Cited

U.S. PATENT DOCUMENTS

| | | | |
|---|---|---|---|
| 2014/0134823 | A1 | 5/2014 | Hendrix et al. |
| 2016/0190550 | A1* | 6/2016 | Choi ............... H01M 4/505 252/182.1 |
| 2018/0375151 | A1 | 12/2018 | Gaben et al. |
| 2020/0119391 | A1* | 4/2020 | Ma ................ H01M 10/0525 |
| 2021/0184249 | A1* | 6/2021 | Ma ................ H01M 10/0525 |
| 2021/0242469 | A1* | 8/2021 | Lee ................ H01M 4/861 |

FOREIGN PATENT DOCUMENTS

| | | | | |
|---|---|---|---|---|
| JP | H07-169456 | A | 7/1995 | |
| JP | 5184212 | B2 | 4/2013 | |
| JP | 2016213178 | A | 12/2016 | |
| KR | 1020160080866 | A | 7/2016 | |
| KR | 1020170067081 | A | 6/2017 | |
| KR | 1020170109374 | A | 9/2017 | |
| KR | 1020200041234 | A | 4/2020 | |
| TW | 201301352 | A | 1/2013 | |
| WO | WO-2017147793 | A1 * | 9/2017 | ............ H01M 12/08 |

OTHER PUBLICATIONS

Mizumoto, Katsuyoshi, and Shinsuke Hayashi. "Lithium ion mobility and activation energy for lithium ion conduction in A-site deficient perovskites La1/3-xLi3xTaO3." Journal of the Ceramic Society of Japan 106.1232 (1998): 369-371. (Year: 1998).*
Mizumoto, Katsuyoshi, and Shinsuke Hayashi. "Lithium ion conduction in A-site deficient perovskites R1/4Li1/4TaO3 (R= La, Nd, Sm and Y)." Solid State Ionics 116.3-4 (1999): 263-269. (Year: 1999).*
Itoh, Mitsuru, et al. "Control of ferromagnetic transition temperature of LaxMnyO3 by lithium insertion." Solid state communications 97.3 (1996): 179-182. (Year: 1996).*
English machine translation of Jin et al. (WO 2017147793 A1) (Year: 2017).*
Fang, Minhua, et al. "The investigation of lithium doping perovskite oxide LiMnO3 as possible LIB anode material." Ceramics International 44.7 (2018): 8223-8231. (Year: 2018).*
Invitation pursuant to Rule 63(1) for European Patent Application No. 19 201 887.7 dated Feb. 21, 2020.
European Search Report for European Patent Application No. 19201887.7 dated Jul. 2, 2020.
Harada et al. "Lithium ion conductivity of A-site deficient perovskite solid solutions", Journal of Power Sources, 81-82, 1999. 777-781.
Kawakami et al., "Ionic conduction of lithium for perovskite type compounds, (Li0.05La0.317)1-xSr0.5xNbO3, (Li0.1La0.3)1-xSr0.5xNbO3 and (Li0.25La0.25)) 1-xm0.5xNbO3(M=Ca and Sr)", Solid State Ionics, 110, 1998, 187-192.
Watababe et al., "Formation of perovskite solid solutions and lithium-ion conductivity in the compositions, Li2xSr1-2xMiii0.5-xTa0.5+xO3", Journal of Power Sources 68, 1997, 421-426.
Antoine A. Emery et al., "Data Descriptor: High-throughput DFT calculations of formation energy, stability and oxygen vacancy formation energy of ABO3 perovskites," Scientific Data, Oct. 17, 2017, pp. 1-10, vol. 153.
English Translation of Office Action dated Oct. 10, 2022 issued in corresponding CN Patent Application No. 201910921293.X, 17 pp.
Office Action dated Oct. 10, 2022 issued in corresponding CN Patent Application No. 201910921293.X, 13 pp.
1 Korean Office Action for Korean Patent Application No. 10-2018-0122041 dated Jan. 2, 2023 .
Kowakami et al.,"Ionic conduction of lithium for perovskite-type compounds, LixLa(1-x)/3NbO3 and (Li0.25Ka0.25) 1-xSr0.5xNbO3",J. Solid State Electrochem, 1998, 2, 206-210.
Fang et al., "The investigation of lithium doping perovskite oxide LiMnO3 as possible LIP anode material", Ceramics International 44, 2018, 8223-8231.
Itoh et al., "Control of Ferromagnetic Transition Temperature of LaxO3 By Lithium Insertion", Solid State Communications, vol. 97, No. 3, 1996, pp. 179-182.
Korean Office Action for Korean Patent Application No. 10-2018-0122041 dated Jun. 29, 2023.
Low Temperature Solid Oxide Fuel Cells, Zongqiang MAO, et al., Shanghai Scientific and Technical Publishers, pp. 125-126(Jan. 31, 2013).
Some Frontier Research Topics in Materials Chemistry, Guangyao Meng, et al., University of Science and Technology of China Press, pp. 143-144(Jan. 31, 2013).
CN Chinese Office Action for Chinese Patent Application No. 201910921293.X dated Jul. 15, 2023.

* cited by examiner

PEROVSKITE MATERIAL, METHOD OF PREPARING THE SAME, AND SECONDARY BATTERY INCLUDING THE PEROVSKITE MATERIAL

CROSS-REFERENCE TO RELATED APPLICATION

This application claims priority to and the benefit of U.S. Provisional Application No. 62/744,614, filed on Oct. 11, 2018, and Korean Patent Application No. 10-2018-0122041, filed on Oct. 12, 2018, and all the benefits accruing therefrom under 35 U.S.C. § 119, the contents of which are incorporated herein by reference in their entirety.

BACKGROUND

1. Field

The present disclosure relates to a perovskite material, a method of preparing the perovskite material, and a secondary battery including the perovskite material.

2. Description of the Related Art

A metal-air battery such as, may include a cathode at which oxygen present in the air is reduced, an anode at which lithium is oxidized, and an electrolyte interposed between the cathode and the anode. The metal-air battery may be a lithium-air battery including a lithium thin film as the anode. The lithium-air battery may serve as a high-capacity battery without the need to store oxygen in the battery.

A cathode of a lithium-air battery may include a carbonaceous material and an organic electrolyte. However, the carbonaceous material and the organic electrolyte may be decomposed by lithium oxide ($Li_2O_2$), which is a reaction product produced during discharge of the lithium-air battery, thereby producing carbon dioxide, which may cause deterioration of the cathode. The carbon dioxide may also be transferred to the anode through the organic electrolyte and subsequently react with the lithium in the anode, thereby causing deterioration of the anode and the charge and discharge characteristics of the lithium-air battery. Therefore, there is a need for improvement of a lithium-air battery in these aspects.

SUMMARY

Provided is a perovskite material and a method of preparing the same.

Provided is a secondary battery including the perovskite material.

Additional aspects will be set forth in part in the description which follows and, in part, will be apparent from the description, or may be learned by practice of the presented embodiments.

According to an aspect of an embodiment, a perovskite material is represented by Formula 1:

$$Li_xA_yM_zO_{3-\delta}$$ Formula 1 wherein, in Formula 1, $0<x\leq1$, $0<y\leq1$, $0<x+y<1$, $0<z\leq1.5$, and $0\leq\delta\leq1$, A is hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), or a combination thereof, and M is nickel (Ni), palladium (Pd), lead (Pb), iron (Fe), iridium (Ir), cobalt (Co), rhodium (Rh), manganese (Mn), chromium (Cr), ruthenium (Ru), rhenium (Re), tin (Sn), vanadium (V), germanium (Ge), tungsten (W), zirconium (Zr), molybdenum (Mo), hafnium (Hf), uranium (U), niobium (Nb), thorium (Th), tantalum (Ta), bismuth (Bi), lithium (Li), hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), magnesium (Mg), aluminum (Al), silicon (Si), scandium (Sc), zinc (Zn), gallium (Ga), silver (Ag), cadmium (Cd), indium (In), antimony (Sb), platinum (Pt), gold (Au), or a combination thereof.

According to an aspect of another embodiment, a perovskite material is a composite represented by Formula 3, and has a ratio of a peak intensity at a diffraction angle 2θ of 46.5°±2.5° to a peak intensity at a diffraction angle 2θ of 32.5°±2.5° of less than 1:

$$Li_xA_yM_zO_{3-\delta}$$ Formula 3 wherein, in Formula 3, $0<x\leq1$, $0<y\leq1$, $0<x+y<1$, $0<z\leq1.5$, and $0\leq\delta\leq1$, A is hydrogen (H) or at least one of a Group 2 to Group 16 element, and M is at least one of a Group 2 to Group 16 element.

The perovskite material may have a ratio of a peak intensity at a diffraction angle 2θ of 57.5°±2.5° to a peak intensity at a diffraction angle 2θ of 32.5°±2.5° of less than 1.

According to an aspect of an embodiment, a method of preparing a perovskite material includes: providing a mixture comprising a lithium compound, an A element-containing compound, an M element-containing compound, and a solvent; first thermally treating the mixture to form a first thermally treated mixture; pulverizing the first thermally treated mixture to obtain a formed product; and second thermally treating the formed product to form the perovskite material, wherein a temperature of the second thermally treating is greater than a temperature of the first thermally treating, wherein A of the A element-containing compound is H, Na, K, Rb, Cs, Ca, Sr, Ba, Y, La, Ce, Pr, Nd, Pm, Sm, Gd, Tb, Dy, Ho, Er, or a combination thereof, and M of the M element-containing compound is Ni, Pd, Pb, Fe, Ir, Co, Rh, Mn, Cr, Ru, Re, Sn, V, Ge, W, Zr, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof.

According to an aspect of an embodiment, a secondary battery includes the perovskite material.

Also disclosed is a secondary battery including a cathode; an anode; and a gas-blocking layer interposed between the cathode and the anode, wherein the cathode or each of the cathode and the gas-blocking layer comprise the perovskite material.

Also disclosed is a secondary battery including a cathode, an anode, and an electrolyte interposed between the cathode and the anode, wherein the cathode or each of the cathode and the electrolyte include the perovskite material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
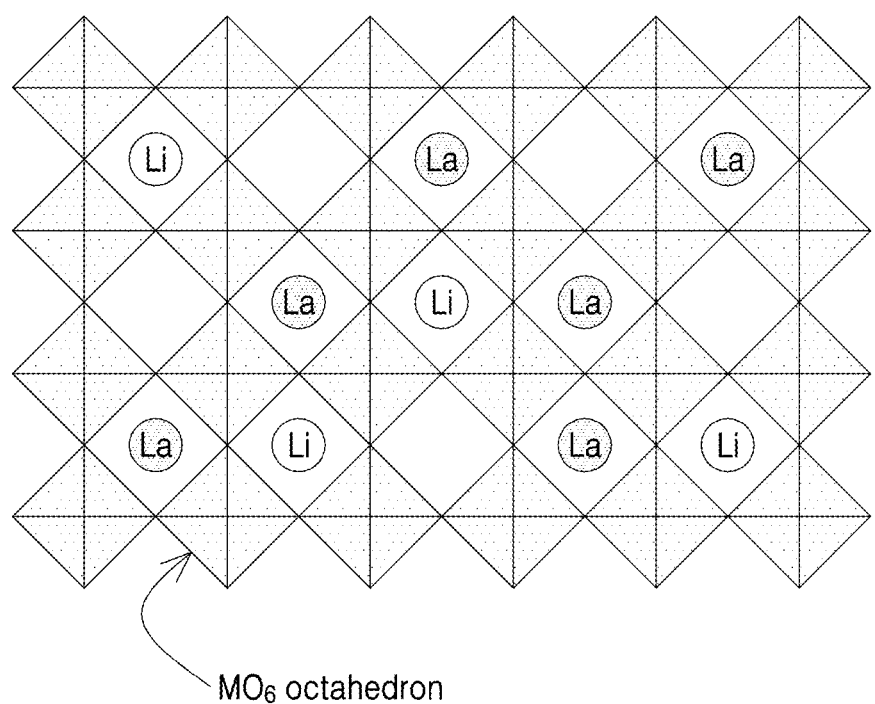
FIG. 1 is a schematic view illustrating a crystal structure of a perovskite material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a perovskite material, a method of preparing the same, and a secondary battery including the perovskite material will be described in greater detail.

According to an aspect, there is provided a perovskite material represented by Formula 1.

$$Li_xA_yM_zO_{3-\delta}$$ <span style="float:right">Formula 1</span>

In Formula 1, $0<x\leq1$, $0<y\leq1$, $0<x+y<1$, $0<z\leq1.5$, $0\leq\delta\leq1$, A may be hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), or a combination thereof.

In an embodiment in which A comprises a combination, A may be represented by $A^1_aA^2_{(1-a)}$ wherein $0<a<1$, and $A^1$ and $A^2$ are each independently hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), or erbium (Er).

M may be nickel (Ni), palladium (Pd), lead (Pb), iron (Fe), iridium (Ir), cobalt (Co), rhodium (Rh), manganese (Mn), chromium (Cr), ruthenium (Ru), rhenium (Re), tin (Sn), vanadium (V), germanium (Ge), tungsten (W), zirconium (Zr), molybdenum (Mo), hafnium (Hf), uranium (U), niobium (Nb), thorium (Th), tantalum (Ta), bismuth (Bi), lithium (Li), hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), magnesium (Mg), aluminum (Al), silicon (Si), scandium (Sc), zinc (Zn), gallium (Ga), silver (Ag), cadmium (Cd), indium (In), antimony (Sb), platinum (Pt), gold (Au), or a combination thereof.

In an embodiment in which M comprises a combination, M may be represented by $M^1_m M^2_{(1-m)}$ wherein 0<m<1, and $M^1$ and $M^2$ are each independently nickel (Ni), palladium (Pd), lead (Pb), iron (Fe), iridium (Ir), cobalt (Co), rhodium (Rh), manganese (Mn), chromium (Cr), ruthenium (Ru), rhenium (Re), tin (Sn), vanadium (V), germanium (Ge), tungsten (W), zirconium (Zr), molybdenum (Mo), hafnium (Hf), uranium (U), niobium (Nb), thorium (Th), tantalum (Ta), bismuth (Bi), lithium (Li), hydrogen (H), sodium (Na), potassium (K), rubidium (Rb), cesium (Cs), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), magnesium (Mg), aluminum (Al), silicon (Si), scandium (Sc), zinc (Zn), gallium (Ga), silver (Ag), cadmium (Cd), indium (In), antimony (Sb), platinum (Pt), or gold (Au).

In Formula 1, A and M may be to the same as or different from each other. For example, A may be La, Ce, Pr, Gd, Ca, Sr, Ba, or a combination thereof, and M may be, for example, Mn, Ni, Ru, Cr, Co, Ru, Ir, Fe, Pd, Pb, Rh, Sn, V, Re, Ge, W, Zr, Mo, Nb, Ta, Hf, Bi, or a combination thereof.

In Formula 1, x may satisfy the range of 0.1<x≤0.5, for example, 0.1<x≤0.45, 0.2<x≤0.5, or 0.3<x≤0.4; y may satisfy the range of 0.2<y≤0.7, for example, 0.4<y≤0.7, or 0.52<y≤0.67; and z may satisfy the range of 0.8<z≤1.2, for example, 0.9<z≤1.1. A sum of x and y may be 0.3 to 0.99, for example, 0.4 to 0.98, for example, 0.6 to 0.97, for example, 0.7 to 0.93, for example, 0.75 to 0.89. In Formula 1, 0.2<x≤0.5, 0.2<y≤0.7, and 0.8<z≤1.2, for example, 0.3<x≤1.4, 0.4<y≤0.7, and 0.9<z≤1.1.

In Formula 1, δ denotes an oxygen vacancy, and the value of δ is selected to make the perovskite material electrically neutral.

In Formula 1, a ratio of x to y may be, for example, about 1:0.5 to about 1:7, or about 1:1 to about 1:6, or about 1:2 to about 1:5.

The perovskite material may be electrically neutral. The perovskite material may have an oxygen vacancy formation energy of 0 to less than about 4 electron volts, for example, about 3.5 electron volts (eV) or less, or about 3 eV or less, or about 2.5 eV or less, for example, 0 eV to about 3.5 eV, or 0 eV to 3 eV, or about 0.1 eV to about 3 eV, or about 0.5 eV to about 2.5 eV. For reference, $Li_{0.34}La_{0.55}TiO_3$, as a perovskite material including titanium, may have an oxygen vacancy formation energy of about 3.59 eV, accordingly, the perovskite material may have an oxygen vacancy formation energy less than the oxygen vacancy formation energy of $Li_{0.34}La_{0.55}TiO_3$, for example, an oxygen vacancy formation energy less than about 3.59 eV, for example, 0 eV to less than about 3.59 eV. As used herein, the "oxygen vacancy formation energy" may be defined by using a quantum computational method. Without being limited by theory, it is understood that the smaller the oxygen vacancy formation energy of the perovskite material, it the easier it may be to form a surplus of electrons due to oxygen vacancies, thereby increasing the electrical conductivity of the perovskite material.

The quantum computational method used to define the oxygen vacancy formation energy, may be a method which is the same as, or substantially similar to the method disclosed by Emery et al (Antoine A. Emery, Chris Wolverton, "High-throughput DFT calculations of formation energy, stability and oxygen vacancy formation energy of $ABO_3$ perovskites," Scientific Data 4, Article number 170153 (2017), hereinafter "Emery"), the content of which is incorporated herein by reference in its entirety. The oxygen vacancy formation energy is a value equal to the difference between the total energy of oxygen and a composition of the formula $A_2B_2O_5$ existing separately and the energy of two $ABO_3$ molecules resulting from the presence of oxygen and $A_2B_2O_5$ together, as illustrated in Equation 1 below.

$$E_v^O = E(A_2B_2O_5) + \mu_O - 2E(ABO_3) \qquad \text{Equation 1}$$

In Equation 1, $E_v^O$ is the oxygen vacancy formation energy, $E(A_2B_2O_5)$ is the energy of $A_2B_2O_5$, $\mu_O$ is the chemical potential of oxygen, and $E(ABO_3)$ is the energy of $ABO_3$. In Equation 1, $A_2B_2O_5$ is a structure in which an oxygen atom has been removed from $A_2B_2O_6$, and the A and B sites are the same as defined in by Emery et al.

The perovskite material represented by Formula 1 may be a compound represented by Formula 2.

$$Li_x A1_y M1_z O_{3-\delta} \qquad \text{Formula 2}$$

In Formula 2, 0.3<x≤1, 0<y≤0.7, 0<z≤1, 0<x+y<1, 0≤δ≤1, A1 may be La, Ce, Pr, Gd, Ca, Sr, Ba, or a combination thereof, and M1 may be Mn, Ni, Ru, Cr, Co, Ru, Ir, Fe, Pd, Pb, Rh, Sn, V, Re, Ge, W, Zr, Mo, Nb, Ta, Hf, Bi, or a combination thereof.

In Formula 2, A1 may be, for example, La, Ca, or a combination thereof, and M1 may be, for example, Ru, Mn, Ni, Cr, Ir, Co, $Mn_{1-a}W_a$, wherein 0<a<1, or a combination thereof.

A lithium-air battery includes a positive electrode (cathode) including a carbonaceous material and an organic electrolyte. In such a lithium-air battery, lithium oxide ($Li_2O_2$) is generated during discharge when lithium originating from an anode reacts with oxygen introduced to the cathode, and the $Li_2O_2$ is then deposited in pores of the cathode while the oxygen is reduced. During discharge, due to the deposition of the lithium oxide in the pores of the cathode, the carbonaceous material and the organic electrolyte may be decomposed, and the resulting decomposition product may deteriorate the lifetime characteristics of the lithium-air battery.

To address these drawbacks, a perovskite material has been advantageously discovered, which is capable of ensuring simultaneous conduction of lithium ions and electrons and which is not susceptible to decomposition by the lithium oxide discharge product.

The perovskite material may have an $ABO_3$ phase including a vacancy at the oxygen site and in which lithium occupies a portion of the A sites. The perovskite material may also have an orthorhombic, cubic, monoclinic, or triclinic crystalline phase, having an oxygen defect. The perovskite material may have improved lithium ion conductivity due to an optimized lithium concentration at the A site, and an increased electronic conductivity due to the introduction of a metal M having a low oxygen vacancy formation energy into the B site.

The perovskite material may have an electronic conductivity of about $1 \times 10^{-6}$ Siemens per centimeter (S/cm) or greater, or about $1 \times 10^{-5}$ S/cm or greater, or about $1 \times 10^{-3}$ S/cm or greater, for example, about $1 \times 10^{-5}$ S/cm to about $1 \times 10^{-1}$ S/cm, or about $1 \times 10^{-4}$ S/cm to about $1 \times 10^{-2}$ S/cm, or more specifically, about $2.6 \times 10^{-4}$ S/cm to about $5.6 \times 10^{-2}$ S/cm, and an ionic conductivity of about $1 \times 10^{-7}$ S/cm or greater, or about $2 \times 10^{-6}$ S/cm or greater, or about $1 \times 10^{-6}$ S/cm or greater, for example, about $1 \times 10^{-7}$ S/cm to about $1 \times 10^{-6}$ S/cm, or about $5 \times 10^{-6}$ S/cm to about $5 \times 10^{-5}$ S/cm, or more specifically, about $2.0 \times 10^{-6}$ S/cm to about $8.8 \times 10^{-5}$ S/cm.

FIG. 1 is a schematic view illustrating a crystal structure of a perovskite material according to an embodiment. In FIG. 1, the perovskite material may be a perovskite material having the structure of Formula 1, in which A is lanthanum (La).

The perovskite material may have a structure including corner-sharing $MO_6$ octahedra, as shown in FIG. 1, in which the six oxygen atoms may define the vertices and M of is be located at the center of the octahedra. The vertices of the $MO_6$ octahedra define a space in which lanthanum (La), lithium (Li), and a vacancy are randomly distributed. In the perovskite material, a lithium ion may be transferred into a vacancy by hopping, and an electron may be transferred to a metal (M) ion layer. In FIG. 1, lanthanum (La) may be replaced by calcium (Ca), and M may be, for example, Ru, Mn Ni, Cr, Ir, Co, Mn, W, or a combination thereof. The perovskite material may exhibit a peak having an X-ray diffraction (XRD) angle 2θ of about 23°, for example, about 23.0°±2.5°. While not wanting to be bound by theory, it is understood that the peak at about 23.0°±2.5° results from arrangement of La in each layer, as illustrated in FIG. 1.

As measured by X-ray diffraction, the perovskite material may have a main peak at a diffraction angle 2θ of 32.5°±2.5°, and a minor peak at a diffraction angle 2θ of 46.5°±2.5° and/or a diffraction angle 2θ of 57.5°±2.5°. The main peak refers to the highest peak, e.g., having the greatest intensity, and the minor peak refers to a peak having an intensity lower than the intensity of the main peak.

The perovskite material may have a ratio ($I_b/I_a$) of a peak intensity ($I*(46.5°±2.5°):I_b$) at a diffraction angle 2θ of 46.5°±2.5° to a peak intensity ($I(32.5°2.5°):I_a$) at a diffraction angle 2θ of 32.5°±2.5° may be less than 1, for example, less than 0.9, for example, less than 0.8, for example, about 0.1 to about 0.8, for example, about 0.2 to about 0.8, for example, about 0.2 to about 0.6. In one or more embodiments, the perovskite material may have a ratio ($I_c/I_a$) of a peak intensity ($I(57.5°±2.5°):I_c$) at a diffraction angle 2θ of 57.5°±2.5° to a peak intensity ($I(32.5°±2.5°):I_a$) at a diffraction angle 2θ of 32.5°±2.5° of less than 1, for example, less than 0.9, for example, less than 0.8, for example, about 0.1 to about 0.8, for example, about 0.2 to about 0.8, for example, about 0.2 to about 0.4.

According to another aspect, a perovskite material may be a composite represented by Formula 3, having a ratio ($I_b/I_a$) of a peak intensity ($I(46.5°±2.5°):I_b$) at a diffraction angle 2θ of 46.5°±2.5° to a peak intensity ($I(32.5°±2.5°):I_a$) at a diffraction angle 2θ of 32.5°±2.5° of less than 1.

$$Li_xA_yM_zO_{3-\delta} \quad \text{Formula 3}$$

In Formula 3, $0<x\leq1$, $0<y\leq1$, $0<x+y<1$, $0<z\leq1.5$, $0\leq\delta\leq1$, A may be hydrogen (H) or at least one element of a Group 2 to Group 16 element of the periodic table of elements, and M may be at least one of a Group 2 to Group 16 element of the periodic table of elements.

The perovskite material may have a ratio ($I_c/I_a$) of a peak intensity ($I(57.5°±2.5°):I_c$) at a diffraction angle 2θ of 57.5°±2.5° to a peak intensity ($I(32.5°±2.5°) I_a$) at a diffraction angle 2θ of 32.5°±2.5° of less than 1.

In Formula 3, A may be, for example, H, Na, K, Rb, Cs, Ca, Sr, Ba, Y, La, Ce, Pr, Nd, Pm, Sm, Gd, Tb, Dy, Ho, Er, or a combination thereof, and M may be, for example, Ni, Pd, Pb, Fe, Ir, Co, Rh, Mn, Cr, Ru, Re, Sn, V, Ge, W, Zr, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof.

For example, the above-described X-ray diffraction angle characteristics may be attributed to, for example, the perovskite material represented by Formula 3 in which A is La, and M in the crystal structure is as illustrated in FIG. 1.

The perovskite material may have an average particle diameter of about 5 nm to about 500 micrometers (μm), for example, about 100 nm to about 15 (μm), for example, about 300 nm to about 10 μm. In one or more embodiments, the perovskite material may have a specific surface area of about 0.01 square meters per gram ($m^2/g$) to about 1000 $m^2/g$, for example, about 0.5 $m^2/g$ to about 100 $m^2/g$, or about 5 $m^2/g$ to about 75 $m^2/g$.

The perovskite material may be, for example, $Li_{0.34}La_{0.55}MnO_3$, $Li_{0.34}La_{0.55}NiO_3$, $Li_{0.34}La_{0.55}CrO_3$, $Li_{0.34}La_{0.55}CoO_3$, $Li_{0.34}La_{0.55}RuO_3$, $Li_{0.34}La_{0.55}RuO_3$, $Li_{0.34}La_{0.55}TiO_3$, $Li_{0.34}La_{0.55}FeO_3$, $Li_{0.34}La_{0.55}PdO_3$, $Li_{0.34}La_{0.55}PbO_3$, $Li_{0.34}La_{0.55}RhO_3$, $Li_{0.34}La_{0.55}SnO_3$, $Li_{0.34}La_{0.55}VO_3$, $Li_{0.34}La_{0.55}ReO_3$, $Li_{0.34}La_{0.55}GeO_3$, $Li_{0.34}La_{0.55}WO_3$, $Li_{0.34}La_{0.55}ZrO_3$, $Li_{0.34}La_{0.55}MoO_3$, $Li_{0.34}La_{0.55}NbO_3$, $Li_{0.34}La_{0.55}TaO_3$, $Li_{0.34}La_{0.55}HfO_3$, $Li_{0.34}La_{0.55}BiO_3$; $Li_{0.10}La_{0.63}MnO_3$, $Li_{0.10}La_{0.63}NiO_3$, $Li_{0.10}La_{0.63}CrO_3$, $Li_{0.10}La_{0.63}CoO_3$, $Li_{0.10}La_{0.63}IrO_3$, $Li_{0.10}La_{0.63}RuO_3$, $Li_{0.10}La_{0.63}TiO_3$, $Li_{0.10}La_{0.63}FeO_3$, $Li_{0.10}La_{0.63}PdO_3$, $Li_{0.10}La_{0.63}PbO_3$, $Li_{0.10}La_{0.63}RhO_3$, $Li_{0.10}La_{0.63}SnO_3$, $Li_{0.10}La_{0.63}VO_3$, $Li_{0.10}La_{0.63}ReO_3$, $Li_{0.10}La_{0.63}GeO_3$, $Li_{0.10}La_{0.63}WO_3$, $Li_{0.10}La_{0.63}ZrO_3$, $Li_{0.10}La_{0.63}MoO_3$, $Li_{0.10}La_{0.63}NbO_3$, $Li_{0.10}La_{0.63}TaO_3$, $Li_{0.10}La_{0.63}HfO_3$, $Li_{0.10}La_{0.63}BiO_3$; $Li_{0.20}La_{0.60}MnO_3$, $Li_{0.20}La_{0.60}NiO_3$, $Li_{0.20}La_{0.60}CrO_3$, $Li_{0.20}La_{0.60}CoO_3$, $Li_{0.20}La_{0.60}IrO_3$, $Li_{0.20}La_{0.60}RuO_3$, $Li_{0.20}La_{0.60}TiO_3$, $Li_{0.20}La_{0.60}FeO_3$, $Li_{0.20}La_{0.60}PdO_3$, $Li_{0.20}La_{0.60}PbO_3$, $Li_{0.20}La_{0.60}RhO_3$, $Li_{0.20}La_{0.60}SnO_3$, $Li_{0.20}La_{0.60}VO_3$, $Li_{0.20}La_{0.60}ReO_3$, $Li_{0.20}La_{0.60}GeO_3$, $Li_{0.20}La_{0.60}WO_3$, $Li_{0.20}La_{0.60}ZrO_3$, $Li_{0.20}La_{0.60}MoO_3$, $Li_{0.20}La_{0.60}NbO_3$, $Li_{0.20}La_{0.60}TaO_3$, $Li_{0.20}La_{0.60}HfO_3$, $Li_{0.20}La_{0.60}BiO_3$; $Li_{0.30}La_{0.57}MnO_3$, $Li_{0.30}La_{0.57}NiO_3$, $Li_{0.30}La_{0.57}CrO_3$, $Li_{0.30}La_{0.57}CoO_3$, $Li_{0.30}La_{0.571}rO_3$, $Li_{0.30}La_{0.57}RuO_3$, $Li_{0.30}La_{0.57}TiO_3$, $Li_{0.30}La_{0.57}FeO_3$, $Li_{0.30}La_{0.57}PdO_3$, $Li_{0.30}La_{0.57}PbO_3$, $Li_{0.30}La_{0.57}RhO_3$, $Li_{0.30}La_{0.57}SnO_3$, $Li_{0.30}La_{0.57}VO_3$, $Li_{0.30}La_{0.57}ReO_3$, $Li_{0.30}La_{0.57}GeO_3$, $Li_{0.30}La_{0.57}WO_3$, $Li_{0.30}La_{0.57}ZrO_3$, $Li_{0.30}La_{0.57}MoO_3$, $Li_{0.30}La_{0.57}NbO_3$, $Li_{0.30}La_{0.57}TaO_3$, $Li_{0.30}La_{0.57}HfO_3$, $Li_{0.30}La_{0.57}BiO_3$, $Li_{0.40}La_{0.53}MnO_3$, $Li_{0.40}La_{0.53}NiO_3$, $Li_{0.40}La_{0.53}CrO_3$, $Li_{0.40}La_{0.53}CoO_3$, $Li_{0.40}La_{0.53}IrO_3$, $Li_{0.40}La_{0.53}RuO_3$, $Li_{0.40}La_{0.53}TiO_3$, $Li_{0.40}La_{0.53}FeO_3$, $Li_{0.40}La_{0.53}PdO_3$, $Li_{0.40}La_{0.53}PbO_3$, $Li_{0.40}La_{0.53}RhO_3$, $Li_{0.40}La_{0.53}SnO_3$, $Li_{0.40}La_{0.53}VO_3$, $Li_{0.40}La_{0.53}ReO_3$, $Li_{0.40}La_{0.53}GeO_3$, $Li_{0.40}La_{0.53}WO_3$, $Li_{0.40}La_{0.53}ZrO_3$, $Li_{0.40}La_{0.53}MoO_3$, $Li_{0.40}La_{0.53}NbO_3$, $Li_{0.40}La_{0.53}TaO_3$, $Li_{0.40}La_{0.53}HfO_3$, $Li_{0.40}La_{0.53}BiO_3$, $Li_{0.45}La_{0.52}MnO_3$, $Li_{0.45}La_{0.52}NiO_3$, $Li_{0.45}La_{0.52}CrO_3$, $Li_{0.45}La_{0.52}CoO_3$, $Li_{0.45}La_{0.52}IrO_3$, $Li_{0.45}La_{0.52}RuO_3$, $Li_{0.45}La_{0.52}TiO_3$, $Li_{0.45}La_{0.52}FeO_3$, $Li_{0.45}La_{0.52}PdO_3$, $Li_{0.45}La_{0.52}PbO_3$, $Li_{0.45}La_{0.52}RhO_3$, $Li_{0.45}La_{0.52}SnO_3$, $Li_{0.45}La_{0.52}VO_3$, $Li_{0.45}La_{0.52}ReO_3$, $Li_{0.45}La_{0.52}GeO_3$, $Li_{0.45}La_{0.52}WO_3$, $Li_{0.45}La_{0.52}ZrO_3$, $Li_{0.45}La_{0.52}MoO_3$, $Li_{0.45}La_{0.52}NbO_3$, $Li_{0.45}La_{0.52}TaO_3$, $Li_{0.45}La_{0.52}HfO_3$, $Li_{0.45}La_{0.52}BiO_3$, $Li_{0.34}Ce_{0.55}MnO_3$, $Li_{0.34}Ce_{0.55}NiO_3$, $Li_{0.34}Ce_{0.55}CrO_3$, $Li_{0.34}Ce_{0.55}CoO_3$, $Li_{0.34}Ce_{0.55}IrO_3$, $Li_{0.34}Ce_{0.55}RuO_3$, $Li_{0.34}Ce_{0.55}TiO_3$, $Li_{0.34}Ce_{0.55}FeO_3$, $Li_{0.34}Ce_{0.55}PdO_3$, $Li_{0.34}Ce_{0.55}PbO_3$, $Li_{0.34}Ce_{0.55}RhO_3$, $Li_{0.34}Ce_{0.55}SnO_3$, $Li_{0.34}Ce_{0.55}VO_3$, $Li_{0.34}Ce_{0.55}ReO_3$, $Li_{0.34}Ce_{0.55}GeO_3$, Li$_{0.34}$Ce$_{0.55}$WO$_3$, Li$_{0.34}$Ce$_{0.55}$ZrO$_3$, Li$_{0.34}$Ce$_{0.55}$MoO$_3$, Li$_{0.34}$Ce$_{0.55}$NbO$_3$, Li$_{0.34}$Ce$_{0.55}$TaO$_3$, Li$_{0.34}$Ce$_{0.55}$HfO$_3$, Li$_{0.34}$Ce$_{0.55}$BiO$_3$, Li$_{0.10}$Ce$_{0.63}$MnO$_3$, Li$_{0.10}$Ce$_{0.63}$NiO$_3$, Li$_{0.10}$Ce$_{0.63}$CrO$_3$, Li$_{0.10}$Ce$_{0.63}$CoO$_3$, Li$_{0.10}$Ce$_{0.63}$IrO$_3$, Li$_{0.10}$Ce$_{0.63}$RuO$_3$, Li$_{0.10}$Ce$_{0.63}$TiO$_3$, Li$_{0.10}$Ce$_{0.63}$FeO$_3$, Li$_{0.10}$Ce$_{0.63}$PdO$_3$, Li$_{0.10}$Ce$_{0.63}$PbO$_3$, Li$_{0.10}$Ce$_{0.63}$RhO$_3$, Li$_{0.10}$Ce$_{0.63}$SnO$_3$, Li$_{0.10}$Ce$_{0.63}$VO$_3$, Li$_{0.10}$Ce$_{0.63}$ReO$_3$, Li$_{0.10}$Ce$_{0.63}$GeO$_3$, Li$_{0.10}$Ce$_{0.63}$WO$_3$, Li$_{0.10}$Ce$_{0.63}$ZrO$_3$, Li$_{0.10}$Ce$_{0.63}$MoO$_3$, Li$_{0.10}$Ce$_{0.63}$NbO$_3$, Li$_{0.10}$Ce$_{0.63}$TaO$_3$, Li$_{0.10}$Ce$_{0.63}$HfO$_3$, Li$_{0.10}$Ce$_{0.63}$BiO$_3$, Li$_{0.20}$Ce$_{0.60}$MnO$_3$, Li$_{0.20}$Ce$_{0.60}$NiO$_3$, Li$_{0.20}$Ce$_{0.60}$CrO$_3$, Li$_{0.20}$Ce$_{0.60}$CoO$_3$, Li$_{0.20}$Ce$_{0.60}$IrO$_3$, Li$_{0.20}$Ce$_{0.60}$RuO$_3$, Li$_{0.20}$Ce$_{0.60}$TiO$_3$, Li$_{0.20}$Ce$_{0.60}$FeO$_3$, Li$_{0.20}$Ce$_{0.60}$PdO$_3$, Li$_{0.20}$Ce$_{0.60}$PbO$_3$, Li$_{0.20}$Ce$_{0.60}$RhO$_3$, Li$_{0.20}$Ce$_{0.60}$SnO$_3$, Li$_{0.20}$Ce$_{0.60}$VO$_3$, Li$_{0.20}$Ce$_{0.60}$ReO$_3$, Li$_{0.20}$Ce$_{0.60}$GeO$_3$, Li$_{0.20}$Ce$_{0.60}$WO$_3$, Li$_{0.20}$Ce$_{0.60}$ZrO$_3$, Li$_{0.20}$Ce$_{0.60}$MoO$_3$, Li$_{0.20}$Ce$_{0.60}$NbO$_3$, Li$_{0.20}$Ce$_{0.60}$TaO$_3$, Li$_{0.20}$Ce$_{0.60}$HfO$_3$, Li$_{0.20}$Ce$_{0.60}$BiO$_3$, Li$_{0.30}$Ce$_{0.57}$MnO$_3$, Li$_{0.30}$Ce$_{0.57}$NiO$_3$, Li$_{0.30}$Ce$_{0.57}$CrO$_3$, Li$_{0.30}$Ce$_{0.57}$CoO$_3$, Li$_{0.30}$Ce$_{0.57}$IrO$_3$, Li$_{0.30}$Ce$_{0.57}$RuO$_3$, Li$_{0.30}$Ce$_{0.57}$TiO$_3$, Li$_{0.30}$Ce$_{0.57}$FeO$_3$, Li$_{0.30}$Ce$_{0.57}$PdO$_3$, Li$_{0.30}$Ce$_{0.57}$PbO$_3$, Li$_{0.30}$Ce$_{0.57}$RhO$_3$, Li$_{0.30}$Ce$_{0.57}$SnO$_3$, Li$_{0.30}$Ce$_{0.57}$VO$_3$, Li$_{0.30}$Ce$_{0.57}$ReO$_3$, Li$_{0.30}$Ce$_{0.57}$GeO$_3$, Li$_{0.30}$Ce$_{0.57}$WO$_3$, Li$_{0.30}$Ce$_{0.57}$ZrO$_3$, Li$_{0.30}$Ce$_{0.57}$MoO$_3$, Li$_{0.30}$Ce$_{0.57}$NbO$_3$, Li$_{0.30}$Ce$_{0.57}$TaO$_3$, Li$_{0.30}$Ce$_{0.57}$HfO$_3$, Li$_{0.30}$Ce$_{0.57}$BiO$_3$, Li$_{0.40}$Ce$_{0.53}$MnO$_3$, Li$_{0.40}$Ce$_{0.53}$NiO$_3$, Li$_{0.40}$Ce$_{0.53}$CrO$_3$, Li$_{0.40}$Ce$_{0.53}$CoO$_3$, Li$_{0.40}$Ce$_{0.53}$IrO$_3$, Li$_{0.40}$Ce$_{0.53}$RuO$_3$, Li$_{0.40}$Ce$_{0.53}$TiO$_3$, Li$_{0.40}$Ce$_{0.53}$FeO$_3$, Li$_{0.40}$Ce$_{0.53}$PdO$_3$, Li$_{0.40}$Ce$_{0.53}$PbO$_3$, Li$_{0.40}$Ce$_{0.53}$RhO$_3$, Li$_{0.40}$Ce$_{0.53}$SnO$_3$, Li$_{0.40}$Ce$_{0.53}$VO$_3$, Li$_{0.40}$Ce$_{0.53}$ReO$_3$, Li$_{0.40}$Ce$_{0.53}$GeO$_3$, Li$_{0.40}$Ce$_{0.53}$WO$_3$, Li$_{0.40}$Ce$_{0.53}$ZrO$_3$, Li$_{0.40}$Ce$_{0.53}$MoO$_3$, Li$_{0.40}$Ce$_{0.53}$NbO$_3$, Li$_{0.40}$Ce$_{0.53}$TaO$_3$, Li$_{0.40}$Ce$_{0.53}$HfO$_3$, Li$_{0.40}$Ce$_{0.53}$BiO$_3$, Li$_{0.45}$Ce$_{0.52}$MnO$_3$, Li$_{0.45}$Ce$_{0.52}$NiO$_3$, Li$_{0.45}$Ce$_{0.52}$CrO$_3$, Li$_{0.45}$Ce$_{0.52}$CoO$_3$, Li$_{0.45}$Ce$_{0.52}$IrO$_3$, Li$_{0.45}$Ce$_{0.52}$RuO$_3$, Li$_{0.45}$Ce$_{0.52}$TiO$_3$, Li$_{0.45}$Ce$_{0.52}$FeO$_3$, Li$_{0.45}$Ce$_{0.52}$PdO$_3$, Li$_{0.45}$Ce$_{0.52}$PbO$_3$, Li$_{0.45}$Ce$_{0.52}$RhO$_3$, Li$_{0.45}$Ce$_{0.52}$SnO$_3$, Li$_{0.45}$Ce$_{0.52}$VO$_3$, Li$_{0.45}$Ce$_{0.52}$ReO$_3$, Li$_{0.45}$Ce$_{0.52}$GeO$_3$, Li$_{0.45}$Ce$_{0.52}$WO$_3$, Li$_{0.45}$Ce$_{0.52}$ZrO$_3$, Li$_{0.45}$Ce$_{0.52}$MoO$_3$, Li$_{0.45}$Ce$_{0.52}$NbO$_3$, Li$_{0.45}$Ce$_{0.52}$TaO$_3$, Li$_{0.45}$Ce$_{0.52}$HfO$_3$, Li$_{0.45}$Ce$_{0.52}$BiO$_3$, Li$_{0.34}$Pr$_{0.55}$MnO$_3$, Li$_{0.34}$Pr$_{0.55}$NiO$_3$, Li$_{0.34}$Pr$_{0.55}$CrO$_3$, Li$_{0.34}$Pr$_{0.55}$CoO$_3$, Li$_{0.34}$Pr$_{0.55}$IrO$_3$, Li$_{0.34}$Pr$_{0.55}$RuO$_3$, Li$_{0.34}$Pr$_{0.55}$TiO$_3$, Li$_{0.34}$Pr$_{0.55}$FeO$_3$, Li$_{0.34}$Pr$_{0.55}$PdO$_3$, Li$_{0.34}$Pr$_{0.55}$PbO$_3$, Li$_{0.34}$Pr$_{0.55}$RhO$_3$, Li$_{0.34}$Pr$_{0.55}$SnO$_3$, Li$_{0.34}$Pr$_{0.55}$VO$_3$, Li$_{0.34}$Pr$_{0.55}$ReO$_3$, Li$_{0.34}$Pr$_{0.55}$GeO$_3$, Li$_{0.34}$Pr$_{0.55}$WO$_3$, Li$_{0.34}$Pr$_{0.55}$ZrO$_3$, Li$_{0.34}$Pr$_{0.55}$MoO$_3$, Li$_{0.34}$Pr$_{0.55}$NbO$_3$, Li$_{0.34}$Pr$_{0.55}$TaO$_3$, Li$_{0.34}$Pr$_{0.55}$HfO$_3$, Li$_{0.34}$Pr$_{0.55}$BiO$_3$, Li$_{0.10}$Pr$_{0.63}$MnO$_3$, Li$_{0.10}$Pr$_{0.63}$NiO$_3$, Li$_{0.10}$Pr$_{0.63}$CrO$_3$, Li$_{0.10}$Pr$_{0.63}$CoO$_3$, Li$_{0.10}$Pr$_{0.63}$IrO$_3$, Li$_{0.10}$Pr$_{0.63}$RuO$_3$, Li$_{0.10}$Pr$_{0.63}$TiO$_3$, L$_{0.10}$Pr$_{0.63}$FeO$_3$, Li$_{0.10}$Pr$_{0.63}$PdO$_3$, Li$_{0.10}$Pr$_{0.63}$PbO$_3$, Li$_{0.10}$Pr$_{0.63}$RhO$_3$, Li$_{0.10}$Pr$_{0.63}$SnO$_3$, Li$_{0.10}$Pr$_{0.63}$VO$_3$, Li$_{0.10}$Pr$_{0.63}$ReO$_3$, Li$_{0.10}$Pr$_{0.63}$GeO$_3$, Li$_{0.10}$Pr$_{0.63}$WO$_3$, Li$_{0.10}$Pr$_{0.63}$ZrO$_3$, Li$_{0.10}$Pr$_{0.63}$MoO$_3$, Li$_{0.10}$Pr$_{0.63}$NbO$_3$, Li$_{0.10}$Pr$_{0.63}$TaO$_3$, Li$_{0.10}$Pr$_{0.63}$HfO$_3$, Li$_{0.10}$Pr$_{0.63}$BiO$_3$, Li$_{0.20}$Pr$_{0.60}$MnO$_3$, Li$_{0.20}$Pr$_{0.60}$NiO$_3$, Li$_{0.20}$Pr$_{0.60}$CrO$_3$, Li$_{0.20}$Pr$_{0.60}$CoO$_3$, Li$_{0.20}$Pr$_{0.60}$IrO$_3$, Li$_{0.20}$Pr$_{0.60}$RuO$_3$, Li$_{0.20}$Pr$_{0.60}$TiO$_3$, Li$_{0.20}$Pr$_{0.60}$FeO$_3$, Li$_{0.20}$Pr$_{0.60}$PdO$_3$, Li$_{0.20}$Pr$_{0.60}$PbO$_3$, Li$_{0.20}$Pr$_{0.60}$RhO$_3$, Li$_{0.20}$Pr$_{0.60}$SnO$_3$, Li$_{0.20}$Pr$_{0.60}$VO$_3$, Li$_{0.20}$Pr$_{0.60}$ReO$_3$, Li$_{0.20}$Pr$_{0.60}$GeO$_3$, Li$_{0.20}$Pr$_{0.60}$WO$_3$, Li$_{0.20}$Pr$_{0.60}$ZrO$_3$, Li$_{0.20}$Pr$_{0.60}$MoO$_3$, Li$_{0.20}$Pr$_{0.60}$NbO$_3$, Li$_{0.20}$Pr$_{0.60}$TaO$_3$, Li$_{0.20}$Pr$_{0.60}$HfO$_3$, Li$_{0.20}$Pr$_{0.60}$BiO$_3$, Li$_{0.30}$Pr$_{0.57}$MnO$_3$, Li$_{0.30}$Pr$_{0.57}$NiO$_3$, Li$_{0.30}$Pr$_{0.57}$CrO$_3$, Li$_{0.30}$Pr$_{0.57}$CoO$_3$, Li$_{0.30}$Pr$_{0.57}$IrO$_3$, Li$_{0.30}$Pr$_{0.57}$RuO$_3$, Li$_{0.30}$Pr$_{0.57}$TiO$_3$, Li$_{0.30}$Pr$_{0.57}$FeO$_3$, Li$_{0.30}$Pr$_{0.57}$PdO$_3$, Li$_{0.30}$Pr$_{0.57}$PbO$_3$, Li$_{0.30}$Pr$_{0.57}$RhO$_3$, Li$_{0.30}$Pr$_{0.57}$SnO$_3$, Li$_{0.30}$Pr$_{0.57}$VO$_3$, Li$_{0.30}$Pr$_{0.57}$ReO$_3$, Li$_{0.30}$Pr$_{0.57}$GeO$_3$, Li$_{0.30}$Pr$_{0.57}$WO$_3$, Li$_{0.30}$Pr$_{0.57}$ZrO$_3$, Li$_{0.30}$Pr$_{0.57}$MoO$_3$, Li$_{0.30}$Pr$_{0.57}$NbO$_3$, Li$_{0.30}$Pr$_{0.57}$TaO$_3$, Li$_{0.30}$Pr$_{0.57}$HfO$_3$, Li$_{0.30}$Pr$_{0.57}$BiO$_3$, Li$_{0.40}$Pr$_{0.53}$MnO$_3$, Li$_{0.40}$Pr$_{0.53}$NiO$_3$, Li$_{0.40}$Pr$_{0.53}$CrO$_3$, Li$_{0.40}$Pr$_{0.53}$CoO$_3$, Li$_{0.40}$Pr$_{0.53}$IrO$_3$, Li$_{0.40}$Pr$_{0.53}$RuO$_3$, Li$_{0.40}$Pr$_{0.53}$TiO$_3$, Li$_{0.40}$Pr$_{0.53}$FeO$_3$, Li$_{0.40}$Pr$_{0.53}$PdO$_3$, Li$_{0.40}$Pr$_{0.53}$PbO$_3$, Li$_{0.40}$Pr$_{0.53}$RhO$_3$, Li$_{0.40}$Pr$_{0.53}$SnO$_3$, Li$_{0.40}$Pr$_{0.53}$VO$_3$, Li$_{0.40}$Pr$_{0.53}$ReO$_3$, Li$_{0.40}$Pr$_{0.53}$GeO$_3$, Li$_{0.40}$Pr$_{0.53}$WO$_3$, Li$_{0.40}$Pr$_{0.53}$ZrO$_3$, Li$_{0.40}$Pr$_{0.53}$MoO$_3$, Li$_{0.40}$Pr$_{0.53}$NbO$_3$, Li$_{0.40}$Pr$_{0.53}$TaO$_3$, Li$_{0.40}$Pr$_{0.53}$HfO$_3$, Li$_{0.40}$Pr$_{0.53}$BiO$_3$, Li$_{0.45}$Pr$_{0.52}$MnO$_3$, Li$_{0.45}$Pr$_{0.52}$NiO$_3$, Li$_{0.45}$Pr$_{0.52}$CrO$_3$, Li$_{0.45}$Pr$_{0.52}$CoO$_3$, Li$_{0.45}$Pr$_{0.52}$IrO$_3$, Li$_{0.45}$Pr$_{0.52}$RuO$_3$, Li$_{0.45}$Pr$_{0.52}$TiO$_3$, Li$_{0.45}$Pr$_{0.52}$FeO$_3$, Li$_{0.45}$Pr$_{0.52}$PdO$_3$, Li$_{0.45}$Pr$_{0.52}$PbO$_3$, Li$_{0.45}$Pr$_{0.52}$RhO$_3$, Li$_{0.45}$Pr$_{0.52}$SnO$_3$, Li$_{0.45}$Pr$_{0.52}$VO$_3$, Li$_{0.45}$Pr$_{0.52}$ReO$_3$, Li$_{0.45}$Pr$_{0.52}$GeO$_3$, Li$_{0.45}$Pr$_{0.52}$WO$_3$, Li$_{0.45}$Pr$_{0.52}$ZrO$_3$, Li$_{0.45}$Pr$_{0.52}$MoO$_3$, Li$_{0.45}$Pr$_{0.52}$NbO$_3$, Li$_{0.45}$Pr$_{0.52}$TaO$_3$, Li$_{0.45}$Pr$_{0.52}$HfO$_3$, Li$_{0.45}$Pr$_{0.52}$BiO$_3$; Li$_{0.10}$Ca$_{0.80}$MnO$_3$, Li$_{0.10}$Ca$_{0.80}$NiO$_3$, Li$_{0.10}$Ca$_{0.80}$CrO$_3$, Li$_{0.10}$Ca$_{0.80}$CoO$_3$, Li$_{0.10}$Ca$_{0.80}$IrO$_3$, Li$_{0.10}$Ca$_{0.80}$RuO$_3$, Li$_{0.10}$Ca$_{0.80}$TiO$_3$, Li$_{0.10}$Ca$_{0.80}$FeO$_3$, Li$_{0.10}$Ca$_{0.80}$PdO$_3$, Li$_{0.10}$Ca$_{0.80}$PbO$_3$, Li$_{0.10}$Ca$_{0.80}$RhO$_3$, Li$_{0.10}$Ca$_{0.80}$SnO$_3$, Li$_{0.10}$Ca$_{0.80}$VO$_3$, Li$_{0.10}$Ca$_{0.80}$ReO$_3$, Li$_{0.10}$Ca$_{0.80}$GeO$_3$, Li$_{0.10}$Ca$_{0.80}$WO$_3$, Li$_{0.10}$Ca$_{0.80}$ZrO$_3$, Li$_{0.10}$Ca$_{0.80}$MoO$_3$, Li$_{0.10}$Ca$_{0.80}$NbO$_3$, Li$_{0.10}$Ca$_{0.80}$TaO$_3$, Li$_{0.10}$Ca$_{0.80}$HfO$_3$, Li$_{0.10}$Ca$_{0.80}$BiO$_3$; Li$_{0.20}$Ca$_{0.60}$MnO$_3$, Li$_{0.20}$Ca$_{0.60}$NiO$_3$, Li$_{0.20}$Ca$_{0.60}$CrO$_3$, Li$_{0.20}$Ca$_{0.60}$CoO$_3$, Li$_{0.20}$Ca$_{0.60}$IrO$_3$, Li$_{0.20}$Ca$_{0.60}$RuO$_3$, Li$_{0.20}$Ca$_{0.60}$TiO$_3$, Li$_{0.20}$Ca$_{0.60}$FeO$_3$, Li$_{0.20}$Ca$_{0.60}$PdO$_3$, Li$_{0.20}$Ca$_{0.60}$PbO$_3$, Li$_{0.20}$Ca$_{0.60}$RhO$_3$, Li$_{0.20}$Ca$_{0.60}$SnO$_3$, Li$_{0.20}$Ca$_{0.60}$VO$_3$, Li$_{0.20}$Ca$_{0.60}$ReO$_3$, Li$_{0.20}$Ca$_{0.60}$GeO$_3$, Li$_{0.20}$Ca$_{0.60}$WO$_3$, Li$_{0.20}$Ca$_{0.60}$ZrO$_3$, Li$_{0.20}$Ca$_{0.60}$MoO$_3$, Li$_{0.20}$Ca$_{0.60}$NbO$_3$, Li$_{0.20}$Ca$_{0.60}$TaO$_3$, Li$_{0.20}$Ca$_{0.60}$HfO$_3$, Li$_{0.20}$Ca$_{0.60}$BiO$_3$; Li$_{0.25}$Ca$_{0.50}$MnO$_3$, Li$_{0.25}$Ca$_{0.50}$NiO$_3$, Li$_{0.25}$Ca$_{0.50}$CrO$_3$, Li$_{0.25}$Ca$_{0.50}$CoO$_3$, Li$_{0.25}$Ca$_{0.50}$IrO$_3$, Li$_{0.25}$Ca$_{0.50}$RuO$_3$, Li$_{0.25}$Ca$_{0.50}$TiO$_3$, Li$_{0.25}$Ca$_{0.50}$FeO$_3$, Li$_{0.25}$Ca$_{0.50}$PdO$_3$, Li$_{0.25}$Ca$_{0.50}$PbO$_3$, Li$_{0.25}$Ca$_{0.50}$RhO$_3$, Li$_{0.25}$Ca$_{0.50}$SnO$_3$, Li$_{0.25}$Ca$_{0.50}$VO$_3$, Li$_{0.25}$Ca$_{0.50}$ReO$_3$, Li$_{0.25}$Ca$_{0.50}$GeO$_3$, Li$_{0.25}$Ca$_{0.50}$WO$_3$, Li$_{0.25}$Ca$_{0.50}$ZrO$_3$, Li$_{0.25}$Ca$_{0.50}$MoO$_3$, Li$_{0.25}$Ca$_{0.50}$NbO$_3$, Li$_{0.25}$Ca$_{0.50}$TaO$_3$, Li$_{0.25}$Ca$_{0.50}$HfO$_3$, Li$_{0.25}$Ca$_{0.50}$BiO$_3$; Li$_{0.30}$Ca$_{0.40}$MnO$_3$, Li$_{0.30}$Ca$_{0.40}$NiO$_3$, Li$_{0.30}$Ca$_{0.40}$CrO$_3$, Li$_{0.30}$Ca$_{0.40}$CoO$_3$, Li$_{0.30}$Ca$_{0.40}$IrO$_3$, Li$_{0.30}$Ca$_{0.40}$RuO$_3$, Li$_{0.30}$Ca$_{0.40}$TiO$_3$, Li$_{0.30}$Ca$_{0.40}$FeO$_3$, Li$_{0.30}$Ca$_{0.40}$PdO$_3$, Li$_{0.30}$Ca$_{0.40}$PbO$_3$, Li$_{0.30}$Ca$_{0.40}$RhO$_3$, Li$_{0.30}$Ca$_{0.40}$SnO$_3$, Li$_{0.30}$Ca$_{0.40}$VO$_3$, Li$_{0.30}$Ca$_{0.40}$ReO$_3$, Li$_{0.30}$Ca$_{0.40}$GeO$_3$, Li$_{0.30}$Ca$_{0.40}$WO$_3$, Li$_{0.30}$Ca$_{0.40}$ZrO$_3$, Li$_{0.30}$Ca$_{0.40}$MoO$_3$, Li$_{0.30}$Ca$_{0.40}$NbO$_3$, Li$_{0.30}$Ca$_{0.40}$TaO$_3$, Li$_{0.30}$Ca$_{0.40}$HfO$_3$, Li$_{0.30}$Ca$_{0.40}$BiO$_3$; Li$_{0.40}$Ca$_{0.20}$MnO$_3$, Li$_{0.40}$Ca$_{0.20}$NiO$_3$, Li$_{0.40}$Ca$_{0.20}$CrO$_3$, Li$_{0.40}$Ca$_{0.20}$CoO$_3$, Li$_{0.40}$Ca$_{0.20}$IrO$_3$, Li$_{0.40}$Ca$_{0.20}$RuO$_3$, Li$_{0.40}$Ca$_{0.20}$TiO$_3$, Li$_{0.40}$Ca$_{0.20}$FeO$_3$, Li$_{0.40}$Ca$_{0.20}$PdO$_3$, Li$_{0.40}$Ca$_{0.20}$PbO$_3$, Li$_{0.40}$Ca$_{0.20}$RhO$_3$, Li$_{0.40}$Ca$_{0.20}$SnO$_3$, Li$_{0.40}$Ca$_{0.20}$VO$_3$, Li$_{0.40}$Ca$_{0.20}$ReO$_3$, Li$_{0.40}$Ca$_{0.20}$GeO$_3$, Li$_{0.40}$Ca$_{0.20}$WO$_3$, Li$_{0.40}$Ca$_{0.20}$ZrO$_3$, Li$_{0.40}$Ca$_{0.20}$MoO$_3$, Li$_{0.40}$Ca$_{0.20}$NbO$_3$, Li$_{0.40}$Ca$_{0.20}$TaO$_3$, Li$_{0.40}$Ca$_{0.20}$HfO$_3$, Li$_{0.40}$Ca$_{0.20}$BiO$_3$; Li$_{0.10}$Sr$_{0.80}$mnO$_3$, Li$_{0.10}$Sr$_{0.80}$NiO$_3$, Li$_{0.10}$Sr$_{0.80}$CrO$_3$, Li$_{0.10}$Sr$_{0.80}$CoO$_3$, Li$_{0.10}$Sr$_{0.80}$IrO$_3$, Li$_{0.10}$Sr$_{0.80}$RuO$_3$, Li$_{0.10}$Sr$_{0.80}$TiO$_3$, Li$_{0.10}$Sr$_{0.80}$FeO$_3$, Li$_{0.10}$Sr$_{0.80}$PdO$_3$, Li$_{0.10}$Sr$_{0.80}$PbO$_3$, Li$_{0.10}$Sr$_{0.80}$RhO$_3$, Li$_{0.10}$Sr$_{0.80}$SnO$_3$, Li$_{0.10}$Sr$_{0.80}$VO$_3$, Li$_{0.10}$Sr$_{0.80}$ReO$_3$, Li$_{0.10}$Sr$_{0.80}$GeO$_3$, Li$_{0.10}$Sr$_{0.80}$WO$_3$, Li$_{0.10}$Sr$_{0.80}$ZrO$_3$, Li$_{0.10}$Sr$_{0.80}$MoO$_3$, Li$_{0.10}$Sr$_{0.80}$NbO$_3$, Li$_{0.10}$Sr$_{0.80}$TaO$_3$, Li$_{0.10}$Sr$_{0.80}$HfO$_3$, Li$_{0.10}$Sr$_{0.80}$BiO$_3$, Li$_{0.20}$Sr$_{0.60}$MnO$_3$, Li$_{0.20}$Sr$_{0.60}$NiO$_3$, Li$_{0.20}$Sr$_{0.60}$CrO$_3$, Li$_{0.20}$Sr$_{0.60}$CoO$_3$, Li$_{0.20}$Sr$_{0.60}$IrO$_3$, Li$_{0.20}$Sr$_{0.60}$RuO$_3$, Li$_{0.20}$Sr$_{0.60}$TiO$_3$, Li$_{0.20}$Sr$_{0.60}$FeO$_3$, Li$_{0.20}$Sr$_{0.60}$PdO$_3$, Li$_{0.20}$Sr$_{0.60}$PbO$_3$, Li$_{0.20}$Sr$_{0.60}$RhO$_3$, Li$_{0.20}$Sr$_{0.60}$SnO$_3$, Li$_{0.20}$Sr$_{0.60}$VO$_3$, Li$_{0.20}$Sr$_{0.60}$ReO$_3$, Li$_{0.20}$Sr$_{0.60}$GeO$_3$, Li$_{0.20}$Sr$_{0.60}$WO$_3$, Li$_{0.20}$Sr$_{0.60}$ZrO$_3$, Li$_{0.20}$Sr$_{0.60}$MoO$_3$, Li$_{0.20}$Sr$_{0.60}$NbO$_3$, Li$_{0.20}$Sr$_{0.60}$TaO$_3$, Li$_{0.20}$Sr$_{0.60}$HfO$_3$, $Li_{0.20}Sr_{0.60}BiO_3$, $Li_{0.25}Sr_{0.50}MnO_3$, $Li_{0.25}Sr_{0.50}NiO_3$, $Li_{0.10}La_{0.80}Mn_{0.70}O_3$, $Li_{0.20}La_{0.77}Mn_{0.70}O_3$,
$Li_{0.25}Sr_{0.50}CrO_3$, $Li_{0.25}Sr_{0.50}CoO_3$, $Li_{0.25}Sr_{0.50}IrO_3$, $Li_{0.05}La_{0.82}Nb_{0.70}O_3$, $Li_{0.10}La_{0.80}Nb_{0.70}O_3$,
$Li_{0.25}Sr_{0.50}RuO_3$, $Li_{0.25}Sr_{0.50}TiO_3$, $Li_{0.25}Sr_{0.50}FeO_3$, $Li_{0.20}La_{0.77}Nb_{0.70}O_3$, $Li_{0.05}La_{0.82}Ta_{0.70}O_3$,
$Li_{0.25}Sr_{0.50}PdO_3$, $Li_{0.25}Sr_{0.50}PbO_3$, $Li_{0.25}Sr_{0.50}RhO_3$, $Li_{0.10}La_{0.80}Ta_{0.70}O_3$, $Li_{0.20}La_{0.77}Ta_{0.70}O_3$,
$Li_{0.25}Sr_{0.50}SnO_3$, $Li_{0.25}Sr_{0.50}VO_3$, $Li_{0.25}Sr_{0.50}ReO_3$, $Li_{0.05}La_{0.82}V_{0.70}O_3$, $Li_{0.10}La_{0.80}V_{0.70}O_3$,
$Li_{0.25}Sr_{0.50}GeO_3$, $Li_{0.25}Sr_{0.50}WO_3$, $Li_{0.25}Sr_{0.50}ZrO_3$, $Li_{0.20}La_{0.77}V_{0.70}O_3$; $Li_{0.05}La_{0.82}W_{0.70}O_3$,
$Li_{0.25}Sr_{0.50}MoO_3$, $Li_{0.25}Sr_{0.50}NbO_3$, $Li_{0.25}Sr_{0.50}TaO_3$, $Li_{0.10}La_{0.80}W_{0.70}O_3$, $Li_{0.20}La_{0.77}W_{0.70}O_3$,
$Li_{0.25}Sr_{0.50}HfO_3$, $Li_{0.25}Sr_{0.50}BiO_3$, $Li_{0.30}Sr_{0.40}MnO_3$, $Li_{0.05}La_{0.82}Mo_{0.70}O_3$, $Li_{0.10}La_{0.80}Mo_{0.70}O_3$,
$Li_{0.30}Sr_{0.40}NiO_3$, $Li_{0.30}Sr_{0.40}CrO_3$, $Li_{0.30}Sr_{0.40}CoO_3$, $Li_{0.20}La_{0.77}Mo_{0.70}O_3$, $Li_{0.05}La_{0.82}Bi_{0.70}O_3$,
$Li_{0.30}Sr_{0.40}IrO_3$, $Li_{0.30}Sr_{0.40}RuO_3$, $Li_{0.30}Sr_{0.40}TiO_3$, $Li_{0.10}La_{0.80}Bi_{0.70}O_3$, $Li_{0.20}La_{0.77}Bi_{0.70}O_3$,
$Li_{0.30}Sr_{0.40}FeO_3$, $Li_{0.30}Sr_{0.40}PdO_3$, $Li_{0.30}Sr_{0.40}PbO_3$, $Li_{0.05}La_{0.82}Cr_{0.70}O_3$, $Li_{0.10}La_{0.80}Cr_{0.70}O_3$,
$Li_{0.30}Sr_{0.40}RhO_3$, $Li_{0.30}Sr_{0.40}SnO_3$, $Li_{0.30}Sr_{0.40}VO_3$, $Li_{0.20}La_{0.77}Cr_{0.70}O_3$, or a combination thereof.

The perovskite material may be a material in which $O_{3-\delta}$ (where $0<\delta\leq1$) is substituted for $O_3$ in any of the above-listed materials.

$Li_{0.30}Sr_{0.40}ReO_3$, $Li_{0.30}Sr_{0.40}GeO_3$, $Li_{0.30}Sr_{0.40}WO_3$,
$Li_{0.30}Sr_{0.40}ZrO_3$, $Li_{0.30}Sr_{0.40}MoO_3$, $Li_{0.30}Sr_{0.40}NbO_3$,
$Li_{0.30}Sr_{0.40}TaO_3$, $Li_{0.30}Sr_{0.40}HfO_3$, $Li_{0.30}Sr_{0.40}BiO_3$,
$Li_{0.40}Sr_{0.20}MnO_3$, $Li_{0.40}Sr_{0.20}NiO_3$, $Li_{0.40}Sr_{0.20}CrO_3$,
$Li_{0.40}Sr_{0.20}CoO_3$, $Li_{0.40}Sr_{0.20}IrO_3$, $Li_{0.40}Sr_{0.20}RuO_3$,
$Li_{0.40}Sr_{0.20}TiO_3$, $Li_{0.40}Sr_{0.20}FeO_3$, $Li_{0.40}Sr_{0.20}PdO_3$,
$Li_{0.40}Sr_{0.20}PbO_3$, $Li_{0.40}Sr_{0.20}RhO_3$, $Li_{0.40}Sr_{0.20}SnO_3$,
$Li_{0.40}Sr_{0.20}VO_3$, $Li_{0.40}Sr_{0.20}ReO_3$, $Li_{0.40}Sr_{0.20}GeO_3$,
$Li_{0.40}Sr_{0.20}WO_3$, $Li_{0.40}Sr_{0.20}ZrO_3$, $Li_{0.40}Sr_{0.20}MoO_3$,
$Li_{0.40}Sr_{0.20}NbO_3$, $Li_{0.40}Sr_{0.20}TaO_3$, $Li_{0.40}Sr_{0.20}HfO_3$,
$Li_{0.40}Sr_{0.20}BiO_3$; $Li_{0.10}Ba_{0.80}MnO_3$, $Li_{0.10}Ba_{0.80}NiO_3$,
$Li_{0.10}Ba_{0.80}CrO_3$, $Li_{0.10}Ba_{0.80}CoO_3$, $Li_{0.10}Ba_{0.80}IrO_3$,
$Li_{0.10}Ba_{0.80}RuO_3$, $Li_{0.10}Ba_{0.80}TiO_3$, $L_{0.10}Ba_{0.80}FeO_3$,
$L_{0.10}Ba_{0.80}PdO_3$, $Li_{0.10}Ba_{0.80}PbO_3$, $Li_{0.10}Ba_{0.80}RhO_3$,
$Li_{0.10}Ba_{0.80}SnO_3$, $Li_{0.10}Ba_{0.80}VO_3$, $Li_{0.10}Ba_{0.80}ReO_3$,
$Li_{0.10}Ba_{0.80}GeO_3$, $Li_{0.10}Ba_{0.80}WO_3$, $Li_{0.10}Ba_{0.80}ZrO_3$,
$Li_{0.10}Ba_{0.80}MoO_3$, $Li_{0.10}Ba_{0.80}NbO_3$, $Li_{0.10}Ba_{0.80}TaO_3$,
$Li_{0.10}Ba_{0.80}HfO_3$, $Li_{0.10}Ba_{0.80}BiO_3$; $Li_{0.20}Ba_{0.60}MnO_3$,
$Li_{0.20}Ba_{0.60}NiO_3$, $Li_{0.20}Ba_{0.60}CrO_3$, $Li_{0.20}Ba_{0.60}CoO_3$,
$Li_{0.20}Ba_{0.60}IrO_3$, $Li_{0.20}Ba_{0.60}RuO_3$, $Li_{0.20}Ba_{0.60}TiO_3$,
$Li_{0.20}Ba_{0.60}FeO_3$, $Li_{0.20}Ba_{0.60}PdO_3$, $Li_{0.20}Ba_{0.60}PbO_3$,
$Li_{0.20}Ba_{0.60}RhO_3$, $Li_{0.20}Ba_{0.60}SnO_3$, $Li_{0.20}Ba_{0.60}VO_3$,
$Li_{0.20}Ba_{0.60}ReO_3$, $Li_{0.20}Ba_{0.60}GeO_3$, $Li_{0.20}Ba_{0.60}WO_3$,
$Li_{0.20}Ba_{0.60}ZrO_3$, $Li_{0.20}Ba_{0.60}MoO_3$, $Li_{0.20}Ba_{0.60}NbO_3$,
$Li_{0.20}Ba_{0.60}TaO_3$, $Li_{0.20}Ba_{0.60}HfO_3$, $Li_{0.20}Ba_{0.60}BiO_3$;
$Li_{0.25}Ba_{0.50}MnO_3$, $Li_{0.25}Ba_{0.50}NiO_3$, $Li_{0.25}Ba_{0.50}CrO_3$,
$Li_{0.25}Ba_{0.50}CoO_3$, $Li_{0.25}Ba_{0.50}IrO_3$, $Li_{0.25}Ba_{0.50}RuO_3$,
$Li_{0.25}Ba_{0.50}TiO_3$, $Li_{0.25}Ba_{0.50}FeO_3$, $Li_{0.25}Ba_{0.50}PdO_3$,
$Li_{0.25}Ba_{0.50}PbO_3$, $Li_{0.25}Ba_{0.50}RhO_3$, $Li_{0.25}Ba_{0.50}SnO_3$,
$Li_{0.25}Ba_{0.50}VO_3$, $Li_{0.25}Ba_{0.50}ReO_3$, $Li_{0.25}Ba_{0.50}GeO_3$,
$Li_{0.25}Ba_{0.50}WO_3$, $Li_{0.25}Ba_{0.50}ZrO_3$, $Li_{0.25}Ba_{0.50}NbO_3$,
$Li_{0.25}Ba_{0.50}NbO_3$, $Li_{0.25}Ba_{0.50}TaO_3$, $Li_{0.25}Ba_{0.50}HfO_3$,
$Li_{0.25}Ba_{0.50}BiO_3$; $Li_{0.30}Ba_{0.40}MnO_3$, $Li_{0.30}Ba_{0.40}NiO_3$,
$Li_{0.30}Ba_{0.40}CrO_3$, $Li_{0.30}Ba_{0.40}CoO_3$, $Li_{0.30}Ba_{0.40}IrO_3$,
$Li_{0.30}Ba_{0.40}RuO_3$, $Li_{0.30}Ba_{0.40}TiO_3$, $Li_{0.30}Ba_{0.40}FeO_3$,
$Li_{0.30}Ba_{0.40}PdO_3$, $Li_{0.30}Ba_{0.40}PbO_3$, $Li_{0.30}Ba_{0.40}RhO_3$,
$Li_{0.30}Ba_{0.40}SnO_3$, $Li_{0.30}Ba_{0.40}VO_3$, $Li_{0.30}Ba_{0.40}ReO_3$,
$Li_{0.30}Ba_{0.40}GeO_3$, $Li_{0.30}Ba_{0.40}WO_3$, $Li_{0.30}Ba_{0.40}ZrO_3$,
$Li_{0.30}Ba_{0.40}MoO_3$, $Li_{0.30}Ba_{0.40}NbO_3$, $Li_{0.30}Ba_{0.40}TaO_3$,
$Li_{0.30}Ba_{0.40}HfO_3$, $Li_{0.30}Ba_{0.40}BiO_3$, $Li_{0.40}Ba_{0.20}MnO_3$,
$Li_{0.40}Ba_{0.20}NiO_3$, $Li_{0.40}Ba_{0.20}CrO_3$, $Li_{0.40}Ba_{0.20}CoO_3$,
$Li_{0.40}Ba_{0.20}IrO_3$, $Li_{0.40}Ba_{0.20}RuO_3$, $Li_{0.40}Ba_{0.20}TiO_3$,
$Li_{0.40}Ba_{0.20}FeO_3$, $Li_{0.40}Ba_{0.20}PdO_3$, $Li_{0.40}Ba_{0.20}PbO_3$,
$Li_{0.40}Ba_{0.20}RhO_3$, $Li_{0.40}Ba_{0.20}SnO_3$, $Li_{0.40}Ba_{0.20}VO_3$,
$Li_{0.40}Ba_{0.20}ReO_3$, $Li_{0.40}Ba_{0.20}GeO_3$, $Li_{0.40}Ba_{0.20}WO_3$,
$Li_{0.40}Ba_{0.20}ZrO_3$, $Li_{0.40}Ba_{0.20}MoO_3$, $Li_{0.40}Ba_{0.20}NbO_3$,
$Li_{0.40}Ba_{0.20}TaO_3$, $Li_{0.40}Ba_{0.20}HfO_3$, $Li_{0.40}Ba_{0.20}BiO_3$,
$Li_{0.25}La_{0.50}MnO_3$, $Li_{0.25}La_{0.50}NiO_3$, $Li_{0.25}La_{0.50}CrO_3$,
$Li_{0.25}La_{0.50}CoO_3$, $Li_{0.25}La_{0.50}IrO_3$, $Li_{0.25}La_{0.50}RuO_3$,
$Li_{0.25}La_{0.50}TiO_3$, $Li_{0.25}La_{0.50}FeO_3$, $Li_{0.25}La_{0.50}PdO_3$,
$Li_{0.25}La_{0.50}PbO_3$, $Li_{0.25}La_{0.50}RhO_3$, $Li_{0.25}La_{0.50}SnO_3$,
$Li_{0.25}La_{0.50}VO_3$, $Li_{0.25}La_{0.50}ReO_3$, $Li_{0.25}La_{0.50}GeO_3$,
$Li_{0.25}La_{0.50}WO_3$, $Li_{0.25}La_{0.50}ZrO_3$, $Li_{0.25}La_{0.50}MoO_3$,
$Li_{0.25}La_{0.50}NbO_3$, $Li_{0.25}La_{0.50}TaO_3$, $Li_{0.25}La_{0.50}HfO_3$,
$Li_{0.25}La_{0.50}BiO_3$; $Li_{0.05}La_{0.82}Mn_{0.70}O_3$,

The perovskite material may be, for example, $Li_{0.34}La_{0.55}RuO_{3-\delta}$ (wherein $0\leq\delta\leq1$), $Li_{0.34}La_{0.55}MnO_{3-\delta}$ (wherein $0\leq\delta\leq1$), $Li_{0.34}La_{0.55}NiO_{3-\delta}$ (wherein $0\leq\delta\leq1$), $Li_{0.34}La_{0.55}CrO_{3-\delta}$ (wherein $0\leq\delta\leq1$), $Li_{0.34}La_{0.55}IrO_{3-\delta}$ (wherein $0\leq\delta\leq1$), $Li_{0.34}La_{0.55}CoO_{3-\delta}$ (wherein $0\leq\delta\leq1$), $Li_{0.34}Ca_{0.58}(Mn_{0.5}W_{0.5})O_{3-\delta}$ (wherein $0\leq\delta\leq1$), or a combination thereof. For example, the perovskite material may be any material in which $\delta$ is 0 in the above-listed formulae, for example, $Li_{0.34}La_{0.55}RuO_3$, $Li_{0.34}La_{0.55}MnO_3$, $Li_{0.34}La_{0.55}NiO_3$, $Li_{0.34}La_{0.55}CrO_3$, $Li_{0.34}La_{0.55}RuO_3$, $Li_{0.34}La_{0.55}CoO_3$, or a combination thereof.

Hereinafter, a method of preparing a perovskite material according to embodiments will be further described.

A mixture of a lithium compound, an A element-containing compound, an M element-containing compound, and a solvent may be provided. Next, a first thermal treatment may be performed on the mixture to provide a first thermally treated mixture. The solvent may be any suitable solvent in which the A element-containing compound and the M element-containing compound may be dissolved and/or dispersed. For example, the solvent may be at least one of ethanol, water, ethylene glycol, or isopropanol. The amount of the solvent may be about 3 parts by weight to about 1,000 parts by weight, or about 200 parts by weight to about 800 parts by weight, for example, about 300 parts by weight to about 600 parts by weight, with respect to 100 parts by weight of a total weight of the lithium compound, the A element-containing compound, and the M element-containing compound.

In the A element-containing compound, A may be hydrogen (H) or at least one element of a Group 1 to Group 16 element of the Periodic Table, and M may be at least one of a Group 1 to Group 16 element of the Periodic Table. For example, A of the A element-containing compound and M of the M element-containing compound may be the same as those defined for A and M in Formula 1 above. That is, A of the A element-containing compound may be H, Na, K, Rb, Cs, Ca, Sr, Ba, Y, La, Ce, Pr, Nd, Pm, Sm, Gd, Tb, Dy, Ho, Er, or a combination thereof, and M of the M element-containing compound may be Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Cs, Ca, Sr, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof.

The provision of the mixture may include combining the lithium compound, the A element-containing compound, the M element-containing compound, and the solvent and mixing to form the mixture. The mixing may be performed by any suitable method, for example, milling, blending, stirring, or a combination thereof. The milling may be performed using, for example, a ball mill, an air-jet mill, a bead mill, a roll mill, or a combination thereof.

The first thermal treatment may be performed at a heating rate of about 1 degree Celsius per minute (° C./min) to about 10° C./min, and a temperature of the first thermal treatment may be in the range of about 600° C. to about 900° C., or about 650° C. to about 900° C. or about 650° C. to about 750° C. During the first thermal treatment, $CO_3$ and OH may be removed. Following the first thermal treatment process, a perovskite material may be obtained by performing a second thermal treatment process that will be further described later. When the heating rate of the first thermal treatment is within the above-described range, the first thermal treatment may be sufficient to enable formation of a perovskite material having a selected crystal structure after the second thermal treatment process that is to be further described later.

The first thermal treatment may be performed in an oxidizing gas atmosphere.

The oxidizing gas atmosphere may be created using, for example, ambient air or pure oxygen. The time of the first thermal treatment may vary depending on the first thermal treatment temperature, and may be, for example, about 1 to 20 hours, for example, about 1 to 10 hours, for example, about 2 to 5 hours.

The lithium compound may be, for example, at least one of lithium oxide, lithium carbonate, lithium chloride, lithium sulfide, lithium nitrate, lithium phosphate, or lithium hydroxide.

The A element-containing compound may be, for example, at least one of lanthanum oxide, lanthanum carbonate, lanthanum chloride, lanthanum sulfide, lanthanum nitrate, lanthanum phosphate, lanthanum hydroxide, yttrium oxide, yttrium carbonate, yttrium chloride, yttrium sulfide, cerium oxide, cerium carbonate, cerium chloride, cerium sulfide, cerium nitrate, cerium phosphate, cerium hydroxide, calcium oxide, calcium carbonate, calcium chloride, calcium sulfide, calcium nitrate, calcium phosphate, calcium hydroxide, barium oxide, barium carbonate, barium chloride, barium sulfide, barium nitrate, barium phosphate, barium hydroxide, strontium oxide, strontium carbonate, strontium chloride, strontium sulfide, strontium nitrate, strontium phosphate, or strontium hydroxide.

The M element-containing compound may be, for example, at least one of nickel oxide, nickel hydroxide, cobalt oxide, cobalt hydroxide, ruthenium oxide, ruthenium hydroxide, chromium oxide, chromium hydroxide, iridium oxide, iridium hydroxide, manganese oxide, or manganese hydroxide.

The amount of the lithium compound, the A element-containing compound, and the M element-containing compound may be stoichiometrically controlled in order to obtain the perovskite material represented by Formula 1.

Next, the product from the first thermal treatment may be pulverized to obtain a formed product. The formed product may be, for example, a powder including a particle. The formed product (particle) may have a particle size of about 10 μm or less, for example, about 5 μm or less, or about 1 μm or less. When a particle size of the formed product is within this range, the particle size may be small enough to ensure sufficient pulverization and mixing, thereby facilitating formation of a crystalline phase in the perovskite material. The expression "particle size" used herein refers to an average particle diameter when the particle is spherical in shape, and refers to a length along the major axis (longest dimension) when the particle is non-spherical. The particle size may be measured using any suitable method, for example, a scanning electron microscope or a particle size analyzer.

The method according one or more embodiments may include heating the formed product using a second thermal treatment to form the perovskite material. A heating rate of the second thermal treatment may be at about 1° C./min to about 10° C./min. A temperature of the second thermal treatment may be, for example, greater than the temperature of the first thermal treatment.

Prior to the second thermal treatment, the formed product (particle) may be pressed into a pellet form. When the formed product is pressed into pellet form and then subsequently heated using the second thermal treatment, a heat diffusion distance in the heated formed product is decreased, and the formation of a perovskite material may be facilitated. On the other hand, when the particle of the formed product is in powder form, and not in pellet form, the heat diffusion distance may be greater than when the formed product is in the pellet form, and as a result, the time and temperature of the second thermal treatment may be increased to form a perovskite material, as compared to when the second thermal treatment is performed on the pellet form.

The conditions of the second thermal treatment may be adjusted according to a predetermined oxidation number of M in Formula 1. For example, the second thermal treatment may be performed in an oxidizing gas atmosphere, a reducing gas atmosphere, or an inert gas atmosphere. The oxidizing gas atmosphere may be created, for example, using ambient air or oxygen. The reducing gas atmosphere may be created using a reducing gas such as hydrogen, and the inert gas atmosphere may be created using a gas such as nitrogen, argon, and/or helium.

The second thermal treatment may be performed at a temperature of about 900° C. to about 1500° C., or about 1000° C. to about 1400° C., or about 1100° C. to about 1200° C. The second thermal treatment time may vary depending on the temperature of the second thermal treatment. The second thermal treatment time may be, for example, about 1 hour to about 50 hours, for example, about 6 hours to about 48 hours, or about 10 hours to about 36 hours.

Through the second thermal treatment a perovskite material may be formed. In the preparation method according to one or more embodiments, if the temperature of the second thermal treatment is less than the temperature of the first thermal treatment, it may be difficult to obtain a perovskite material having a crystalline phase. When a time and temperature of the second thermal treatment are within the above-described ranges, the second thermal treatment may be capable of forming the perovskite material having a crystalline structure, and the synthesis time of the perovskite material may be short enough to be economically and commercially beneficial.

According to another aspect, a secondary battery includes a perovskite material according to any of the above-described embodiments. The secondary battery may include a cathode, an anode, and an electrolyte interposed between the cathode and the anode. The cathode, or each of the cathode and the electrolyte may include the perovskite material according to any of the above-described embodiments.

The secondary battery may be, for example, a lithium-air battery, a lithium ion battery, or an all-solid-state lithium secondary battery. The shape of the secondary battery is not limited and may have any of a variety of shapes, for example, a shape like a coin, a button, a sheet, a stack, a cylinder, a plane, or a horn. The secondary battery may also be used as a large-scale battery for an electric vehicle.

The secondary battery may be, for example, a lithium-air battery. The lithium-air battery may include a cathode including the perovskite material according to any of the above-described embodiments, a gas blocking layer (for example, an oxygen blocking layer), and a lithium-containing anode. Since the cathode of the lithium-air battery includes the perovskite material according to any of the above-described embodiments, the lithium-air battery may have improved charge and discharge characteristics. The cathode may also serve as an electrolyte.

Figure 2:
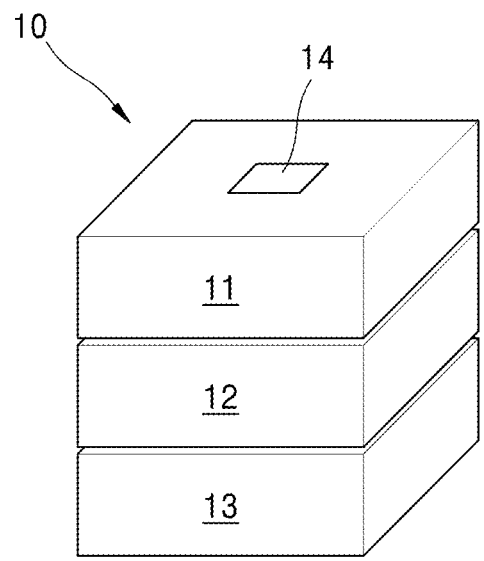
FIG. 2 is a schematic view illustrating a structure of a lithium-air battery employing a cathode including a perovskite material according to an embodiment.

FIG. 2 is a schematic view illustrating a structure of a lithium-air battery 10 including a perovskite material according to one of the above-described embodiments. Referring to FIG. 2, the lithium-air battery 10 as a secondary battery according to an embodiment may have a structure including a cathode 11 including the perovskite material, an anode 13, and a gas blocking layer 12 interposed between the cathode 11 and the anode 13. The gas-blocking layer 12 may be, for example, a layer impervious to oxygen. The cathode 11 may consist essentially of or consist of the perovskite material without any binder or electrolyte.

Figure 3:
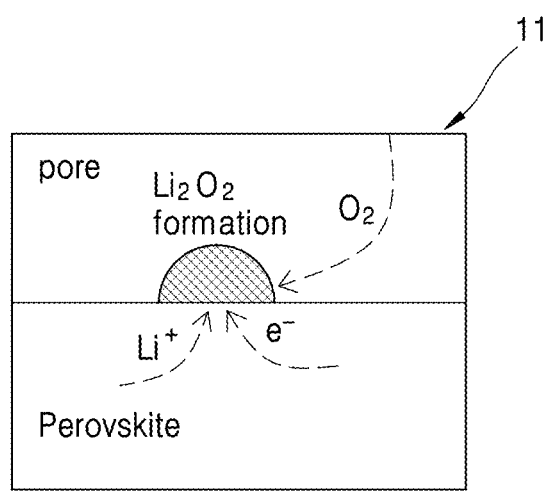
FIG. 3 illustrates a conduction of lithium ions and electrons in a region of the cathode of FIG. 2.

FIG. 3 is an enlarged partial view of the cathode 11 of FIG. 2.

Referring to FIG. 3, in the cathode 11, the perovskite material facilitates simultaneous conduction of lithium ions ($Li^+$) and electrons ($e^-$). The perovskite material, is a mixed conductive material having both optimized ionic conductivity and electronic conductivity. The perovskite material may also serve as a cathode intermediate layer due to excellent resistance to chemicals and stability of the crystalline structure. The perovskite material may be not decomposed to any degree by the lithium oxide ($Li_2O_2$) that is formed during discharge and deposited in a pore 15 of the cathode 11. Accordingly, the perovskite material prevents deterioration in the lifetime characteristics of a lithium-air battery caused by the decomposition of a carbonaceous material and an organic polymer electrolyte in a cathode including the same.

The cathode 11 may be manufactured by thermal treatment (heating) of the perovskite material according to any of the above-described embodiments at a temperature of about 500° C. to about 1400° C., or about 600° C. to about 1300° C., or about 750° C. to about 1200° C. When the thermal treatment temperature is within this range, the manufactured cathode 11 may have excellent ionic conductivity and electronic conductivity.

The weight and thickness of the cathode 11 manufactured as described above, are not limited. For example, the cathode 11 may have a weight of about 0.1 milligrams (mg) to about 1000 mg, or about 1 mg to about 750 mg, or about 10 mg to about 500 mg, and a thickness of about 0.1 µm to about 1000 µm, or about 1 µm to about 800 µm, or about 100 µm to about 500 µm.

Next, after the cathode 11 is disposed on a surface of the gas blocking layer 12, the anode 13 may be disposed on a surface of the gas blocking layer 12 opposite the cathode 11.

After the cathode 11 and the anode 13 are disposed on the gas blocking layer 12, a thermal treatment may be performed. The thermal treatment temperature may be, for example, about 500° C. to about 1000° C., or about 600° C. to about 1300° C., or about 750° C. to about 1200° C.

The anode 13 may be a lithium-containing anode. For example, the anode 13 may be a lithium metal thin film and/or a lithium-based alloy thin film. The lithium metal-based alloy may be an alloy of lithium with at least one of, for example, aluminum, tin, magnesium, indium, calcium, titanium, or vanadium.

The gas blocking layer 12, acts as a lithium ion conductive solid electrolyte membrane, and may also function as a protective layer for preventing direct reaction between the lithium metal anode and impurities such as oxygen. For example, the lithium ion conductive solid electrolyte membrane may be a layer including an inorganic material, for example, a lithium ion conductive glass, a lithium ion conductive crystal (e.g., ceramic or glass-ceramic), or a combination thereof. However, embodiments are not limited thereto. For example, any solid electrolyte membrane having lithium ion conductivity, impervious to oxygen, and capable of protecting the anode, may be used. For example, in view of chemical stability, the lithium ion conductive solid electrolyte membrane may include a metal oxide.

When the lithium ion conductive solid electrolyte membrane contains a large percentage of lithium ion conductive crystals, high ionic conductivity may be obtained. For example, the lithium ion conductive solid electrolyte membrane may include about 50 wt % or greater, for example, about 55 wt % or greater, or about 60 wt % or greater of lithium ion conductive crystals, based on a total weight of the lithium ion conductive solid electrolyte membrane.

The lithium ion conductive crystals may include for example, $Li_3N$, a lithium super ionic conductor (LISICON), or crystals having a perovskite structure and lithium ion conductivity, for example, $La_{0.55}Li_{0.35}TiO_3$; $LiTi_2P_3O_{12}$ having a NASICON type structure; $Li_{1+x+y}(Al, Ga)_x(Ti, Ge)_{2-x}Si_yP_{3-y}O_{12}$ (wherein 0≤x≤1 and 0≤y≤1, for example, 0≤x≤0.4 and 0≤y≤0.6, or 0.1≤x≤0.3 and 0.1<y≤0.4); a glass-ceramic able to precipitate these crystals; or a combination thereof.

Non-limiting examples of a lithium ion conductive glass-ceramic may include lithium-aluminum-germanium-phosphate (LAGP), lithium-aluminum-titanium-phosphate (LATP), lithium-aluminum-titanium-silicon-phosphate (LATSP), or a combination thereof. For example, when a mother glass having a $Li_2O$—$Al_2O_3$—$TiO_2$—$SiO_2P_2O_5$ composition is crystallized by a thermal treatment, the resulting primary crystal phase may be $Li_{1+x+y}Al_xTi_{2-x}Si_yP_{3-y}O_{12}$ (wherein 0≤x≤1 and 0≤y≤1). For example, in the formula of $Li_{1+x+y}Al_xTi_{2-x}Si_yP_{3-y}O_{12}$, x and y may satisfy, for example, 0≤x≤0.4 and 0<y≤0.6, for example, 0.1≤x≤0.3 and 0.1<y≤0.4.

The lithium ion conductive glass-ceramic of the gas blocking layer 12 may include $Li_{1+x+y}Al_xTi_{2-x}Si_yP_{3-y}O_{12}$ (wherein 0≤x≤1 and 0≤y≤1, for example, 0≤x≤0.4 and 0<y≤0.6, for example, 0.1≤x≤0.3 and 0.1<y≤0.4), or $Li_{1+x+y}Al_x(Ti,Ge)_{2-x}Si_yP_{3-y}O_{12}$ (wherein 0≤x≤2 and 0≤y≤3). For example, the gas blocking layer 12 may be a solid electrolyte membrane including LATP ($Li_{1.4}Ti_{1.6}Al_{0.4}P_3O_{12}$).

In one or more embodiments, the lithium-air battery may further include a cathode intermediate layer (not shown) between the cathode 11 and the gas blocking layer 12. The lithium-air battery may further include an anode intermediate layer (not shown) between the gas blocking layer 12 and the anode 13. The cathode intermediate layer and the anode intermediate layer may suppress a side reaction that may take place between the cathode or the anode and the gas blocking layer 12. The cathode intermediate layer and the anode intermediate layer may each have a thickness of, for example, about 0.1 µm to about 10 µm, or about 1 µm to about 10 µm, or about 1 µm to about 7.5 µm.

The cathode intermediate layer and the anode intermediate layer may each include an electrolyte including at least one of a liquid electrolyte, a gel electrolyte, or a solid electrolyte.

The liquid electrolyte, the gel electrolyte, and the solid electrolyte are not particularly limited, and may be any electrolyte suitable for a lithium-air battery.

For example, the liquid electrolyte may include a solvent and a lithium salt. The solvent may include at least one of an organic solvent, an ionic liquid, or an oligomer. However, embodiments are not limited thereto. Any solvent in liquid form at room temperature (25° C.) may be used.

The organic solvent may include at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, or dimethoxyethane. However, embodiments are not limited thereto. The organic solvent may be any organic solvent that is in liquid form at room temperature.

The lithium salt may include at least one of LiTFSI, $LiPF_6$, $LiBF_4$, $LiAsF_6$, $LiNO_3$, lithium bis(oxalato) borate (LiBOB), $LiCF_3SO_3$ (lithium trifluoromethanesulfonate, lithium triflate, LiTfO), $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$. However, embodiments are not limited thereto. Any materials suitable for use as a lithium salt may be used. A concentration of the lithium salt may be about 0.01 molar (M) to about 3.0 M. However, embodiments are not limited thereto. The concentration of the lithium salt may be appropriately adjusted as desired.

A non-limiting example of the solid electrolyte may include at least one of an ionically conducting polymer, a polymeric ionic liquid (PIL), an inorganic electrolyte, a polymer matrix, or an electronically conducting polymer. The polymer matrix may not have ionic conductivity or electronic conductivity.

The solid electrolyte may include at least one of polyethylene oxide (PEO), a solid graft copolymer including at least two polymer blocks having low glass transition temperatures (Tg), poly(diallyldimethylammonium)/bis(trifluoromethanesulfonyl) imide (poly(diallyldimethylammonium)TFSI), $Cu_3N$, $Li_3N$, lithium phosphorous oxynitride (LiPON), $Li_3PO_4 \cdot Li_2S \cdot SiS_2$, $Li_2S \cdot GeS_2 \cdot Ga_2S_3$, $Li_2O \cdot 11Al_2O_3$, $Na_2O \cdot 11Al_2O_3$, $(Na,Li)_{1+x}Ti_{2-x}Al_x(PO_4)_3$ (wherein 0.1≤x≤0.9), $Li_{1+x}Hf_{2-x}Al_x(PO_4)_3$ (wherein 0.1≤x≤0.9), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-silicate, $Li_{0.3}a_{0.5}TiO_3$, $Na_5MSi_4O_{12}$ (wherein M may be a rare earth element, for example, Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein 0≤x≤0.8, 0≤y≤1.0, and M may be Nd, Sm, Eu, Gd, Tb, Dy, Ho, Er, Tm, or Yb), $Li_{1+x+y}Q_xTi_{2-x}Si_yP_{3-y}O_{12}$ (wherein 0≤x≤0.4, 0<y≤0.6, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M may be Nb or Ta), or $Li_{7+x}A_xLa_{3-x}Zr_2O_{12}$ (wherein 0<x≤3 and A may be Zn).

The solid electrolyte may include, as an ion conductive polymer, an ion conductive repeating unit which may be at least one of an ether-based monomer, an acryl-based monomer, a methacryl-based monomer, or a siloxane-based monomer.

The ion conductive polymer may be at least one of polyethylene oxide, polypropylene oxide, poly(methyl methacrylate), poly(ethyl methacrylate), polydimethylsiloxane, polyacrylate, polyethyl acrylate, poly(2-ethylhexyl acrylate), poly(butyl methacrylate), poly(2-ethylhexyl methacrylate), poly(decyl acrylate), or polyethylene vinyl acetate. The ion conductive polymer may be a copolymer including an ion conductive repeating unit and a structural repeating unit. The ion conductive repeating unit may be derived from at least one monomer of acrylic acid, methacrylic acid, methyl acrylate, methyl methacrylate, ethyl acrylate, ethyl methacrylate, 2-ethylhexyl acrylate, butyl methacrylate, 2-ethylhexyl methacrylate, decyl acrylate, ethylene vinyl acetate, ethylene oxide, or propylene oxide. For example, the structural repeating unit may be derived from at least one monomer of styrene, 4-bromo styrene, tert-butylstyrene, divinylbenzene, methyl methacrylate, isobutyl methacrylate, butadiene, ethylene, propylene, dimethyl siloxane, isobutylene, N-isopropyl acrylamide, vinyl fluoride, acrylonitrile, 4-methyl-1-pentene, butylene terephthalate, ethylene terephthalate, or vinyl pyridine. The ion conductive polymer may be a block copolymer including an ion conductive phase and a structural phase. Examples of the block copolymer including an ion conductive phase and a structural phase may include block copolymers disclosed in U.S. Pat. Nos. 8,269,197 and 8,563,168, and U.S. patent publication No. 2011/0206994, the contents of each of which are incorporated herein by reference in their entirety.

The anode intermediate layer may include a solid polymer electrolyte. For example, the solid polymer electrolyte may be polyethylene oxide (PEO) doped with a lithium salt, wherein non-limiting examples of the lithium salt may be at least one of $LiN(SO_2F)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$. The anode intermediate layer may be a polymer electrolyte prepared by mixing polyethylene oxide and a lithium salt.

The cathode intermediate layer may be, for example, a polymer electrolyte prepared by mixing poly(oxyethylene methacrylate) poly(dimethyl siloxane) and a lithium salt.

The lithium-air battery may further include an electrolyte. The electrolyte may have a structure including a separator impregnated with a solid polymer electrolyte. The structure having the separator impregnated with the solid polymer electrolyte may be prepared by disposing a solid polymer electrolyte film on one or both surfaces of the separator and roll-pressing the separator-film structure at the same time. In some embodiments, the structure may be prepared by injecting a liquid electrolyte including a lithium salt into the separator.

Next, after mounting the anode on an inner side of a case, the cathode with the gas blocking layer thereon may be disposed on the anode. The anode intermediate layer, when present, may be further disposed between the anode and the gas blocking layer. The cathode intermediate layer, when present, may be further disposed between the gas blocking layer and the cathode. The gas blocking layer may be oxygen blocking layer.

Next, a gas diffusion layer including metal or carbon may be disposed on the cathode, thereby completing the manufacture of the lithium-air battery.

One or more embodiments of the inventive concept will now be described in detail with reference to the following examples. However, these examples are only for illustrative purposes and are not intended to limit the scope of the one or more embodiments of the inventive concept.

EXAMPLES

Example 1

Preparation of Perovskite Material
($Li_{0.34}La_{0.55}RuO_{3-\delta}$) ($0 \leq \delta \leq 1$)

$Li_2CO_3$, $La_2O_3$, and $RuO_2$ powders were added into ethanol in stoichiometric amounts to provide the composition of $Li_{0.34}La_{0.55}RuO_{3-\delta}$ (wherein $0 \leq \delta \leq 1$), and then mixed. The resulting mixture was then put into a ball-mill mixer and pulverized and mixed for about 4 hours. The resulting mixture was dried and then heated to about 800° C. at a heating rate of about 5° C./min, followed by a continuous first thermal treatment at the same temperature for about 4 hours in an air atmosphere.

The resulting heated mixture obtained after the first thermal treatment was pulverized into a powder (primary particles) having a particle size of about 0.3 μm. This powder was then pressed to form cylindrical pellets having a diameter of about 1.3 centimeters (cm), a height of about 0.5 cm, and a weight of about 0.3 grams (g). The pellets were then subjected to a second thermal treatment in an air atmosphere at a temperature of about 1200° C. for about 24 hours to obtain a target product. For the second thermal treatment, the temperature was increased to 1200° C. at a heating rate of about 5° C./min. The target product was $Li_{0.34}La_{0.55}RuO_{3-\delta}$ with $\delta=0$ and/or $0<\delta 1$.

Example 2

Preparation of Perovskite Material
($Li_{0.34}La_{0.55}NiO_{3-\delta}$) ($0 \leq \delta \leq 1$)

A target product was obtained in the same manner as in Example 1, except that $Ni(OH)_2$ was used instead of $RuO_2$. The target product was $Li_{0.34}La_{0.55}NiO_{3-\delta}$ with $\delta=0$ and/or $0<\delta \leq 1$.

Example 3

Preparation of Perovskite Material
($Li_{0.34}La_{0.55}MnO_{3-\delta}$) ($0 \leq \delta \leq 1$)

A target product was obtained in the same manner as in Example 1, except that $MnO_2$ was used instead of $RuO_2$. The target product was $Li_{0.34}La_{0.55}MnO_{3-\delta}$ with $\delta=0$ and/or $0<\delta \leq 1$.

Example 4

Preparation of Perovskite Material
($Li_{0.34}La_{0.55}CrO_{3-\delta}$) ($0 \leq \delta \leq 1$)

A target product was obtained in the same manner as in Example 1, except that $Cr_2O_3$ was used instead of $RuO_2$. The target product was $Li_{0.34}La_{0.55}CrO_{3-\delta}$ with $\delta=0$ and/or $0<\delta \leq 1$.

Example 5

Preparation of Perovskite Material
($Li_{0.34}La_{0.55}CoO_{3-\delta}$) ($0 \leq \delta \leq 1$)

A target product was obtained in the same manner as in Example 1, except that $Co_2O_3$ was used instead of $RuO_2$. The target product was $Li_{0.34}La_{0.55}CoO_{3-\delta}$ with $\delta=0$ and/or $0<\delta \leq 1$.

Example 6

Preparation of Perovskite Material
($Li_{0.34}La_{0.55}IrO_{3-\delta}$) ($0 \leq \delta \leq 1$)

A target product was obtained in the same manner as in Example 1, except that $IrO_2$ was used instead of $RuO_2$. The target product was $Li_{0.34}La_{0.55}CoO_{3-\delta}$ with $\delta=0$ and/or $0<\delta \leq 1$.

Comparative Example 1

Preparation of Perovskite Material
($Li_{0.34}La_{0.55}TiO_3$)

A target product was obtained in the same manner as in Example 1, except that $TiO_2$ was used instead of $RuO_2$ and both the first thermal treatment and the second thermal treatment were performed at about 1000° C.

Example 7

Manufacturing of Lithium-Air Battery

A cathode having a weight of about 5 milligrams per square centimeter (mg/cm$^2$) per unit area and a thickness of about 10 μm was manufactured by heating the perovskite material $Li_{0.34}La_{0.55}RuO_{3-\delta}$ (wherein $0 \leq \delta \leq 1$) prepared according to Example 1 at about 1000° C. under the air atmosphere for about 60 minutes.

A lithium-aluminum-titaniumphosphate (LATP) layer having a thickness of about 250 μm (available from Ohara Corp., Japan) was disposed as a gas blocking layer on a lower surface of the cathode, and the lower surface of the cathode with the gas blocking layer was heated at about 900° C. for about 60 minutes.

A polymer electrolyte as an anode intermediate layer was disposed under the gas blocking layer. The polymer electrolyte was prepared by mixing polyethylene oxide (Mn=100,000 Daltons) and lithium bis(trifluoromethylsulonly)imide (LiTFSI) as a lithium salt in an EO/Li molar ratio of 20:1.

A lithium metal foil was disposed under the polymer electrolyte, and a gas diffusion layer (GDL) (25BC, available from SGL) was attached to an upper surface of the cathode. A nickel mesh was disposed on the GDL, and then pressed with a pressing member capable of transferring air to the cathode to fix the cell, thereby manufacturing a lithium-air battery.

Example 8

Manufacturing of Lithium-Air Battery

A lithium-air battery was manufactured in the same manner as in Example 7, except that the perovskite material $Li_{0.34}La_{0.55}MnO_{3-\delta}$ (wherein $0 \leq \delta \leq 1$) prepared according to Example 3 was used instead of the perovskite material $Li_{0.34}La_{0.55}RuO_{3-\delta}$ (wherein $0 \leq \delta \leq 1$) of Example 1.

Example 9

Manufacturing of Lithium-Air Battery

A cathode having a weight of about 5 mg/cm² per unit area and a thickness of about 10 μm was manufactured by heating the perovskite material $Li_{0.34}La_{0.55}RuO_{3-\delta}$ (wherein $0 \leq \delta \leq 1$) prepared according to Example 1 at about 1000° C. under the air atmosphere for about 60 minutes.

A polymer electrolyte as a cathode intermediate layer was disposed on a surface of a lithium-aluminum-titaniumphosphate (LATP) layer having a thickness of about 250 μm (available from Ohara Corp., Japan) and serving as a gas blocking layer. This polymer electrolyte was prepared by mixing a copolymer of poly(oxyethylene methacrylate) and polydimethyl siloxane (Mn=100,000 Daltons)(a weight ratio of poly(oxyethylene) methacrylate and polydimethyl siloxane=7:3) and lithium bis(trifluoromethylsulonly)imide (LiTFSI) as a lithium salt in an EO/Li molar ratio of 20:1.

Subsequently, a polymer electrolyte as an anode intermediate layer was disposed on an opposite surface of the gas blocking layer. This polymer electrolyte was prepared by mixing polyethylene oxide (Mn=600,000 Daltons) and lithium bis(trifluoromethylsulonly)imide (LiTFSI) as a lithium salt in an EO/Li molar ratio of 20:1.

A lithium metal foil was disposed under the polymer electrolyte, and a gas diffusion layer (GDL) (25BC, available from SGL) was attached to an upper surface of the cathode. A nickel mesh was arranged on the GDL, and then pressed with a pressing member capable of transferring air to the cathode to fix the cell, thereby manufacturing a lithium-air battery.

Example 10

A lithium-air battery was manufactured in the same manner as in Example 9, except that the perovskite material $Li_{0.34}La_{0.55}MnO_{3-\delta}$ (wherein $0 \leq \delta \leq 1$) prepared according to Example 3 was used instead of the perovskite material $Li_{0.34}La_{0.55}RuO_{3-\delta}$ (wherein $0 \leq \delta \leq 1$) of Example 1.

Example 11

Perovskite materials were prepared in the same manner as in Example 1, except that the amounts of $Li_2CO_3$, $La_2O_3$, and $RuO_2$ were varied to provide the perovskite materials represented in Table 1.

TABLE 1

| Samples of Example 11 | Composition of perovskite material |
|---|---|
| 11-1 | $Li_{0.20}La_{0.60}MnO_{3-\delta}$ ($0 \leq \delta \leq 1$) |
| 11-2 | $Li_{0.30}La_{0.57}MnO_{3-\delta}$ ($0 \leq \delta \leq 1$) |
| 11-3 | $Li_{0.40}La_{0.53}MnO_{3-\delta}$ ($0 \leq \delta \leq 1$) |
| 11-4 | $Li_{0.45}La_{0.52}MnO_{3-\delta}$ ($0 \leq \delta \leq 1$) |

Example 12

Perovskite materials were prepared in the same manner as in Example 3, except that the amounts of $Li_2CO_3$, $La_2O_3$, and $MnO_2$ were varied to provide the compositions of perovskite materials represented in Table 2.

TABLE 2

| Samples of Example 12 | Composition of perovskite material |
|---|---|
| 12-1 | $Li_{0.20}La_{0.60}RuO_{3-\delta}$ ($0 \leq \delta \leq 1$) |
| 12-2 | $Li_{0.30}La_{0.57}RuO_{3-\delta}$ ($0 \leq \delta \leq 1$) |
| 12-3 | $Li_{0.40}La_{0.53}RuO_{3-\delta}$ ($0 \leq \delta \leq 1$) |
| 12-4 | $Li_{0.45}La_{0.52}RuO_{3-\delta}$ ($0 \leq \delta \leq 1$) |

Comparative Example 2

Manufacturing of Lithium-Air Battery

A lithium-air battery was manufactured in the same manner as in Example 7, except that the perovskite material $Li_{0.34}La_{0.55}TiO_{3-\delta}$ (wherein $0 \leq \delta \leq 1$) prepared according to Comparative Example 1 was used instead of the perovskite material $Li_{0.34}La_{0.55}RuO_{3-\delta}$ (wherein $0 \leq \delta \leq 1$) of Example 1.

Evaluation Example 1

X-Ray Diffraction Analysis

Figure 4A:
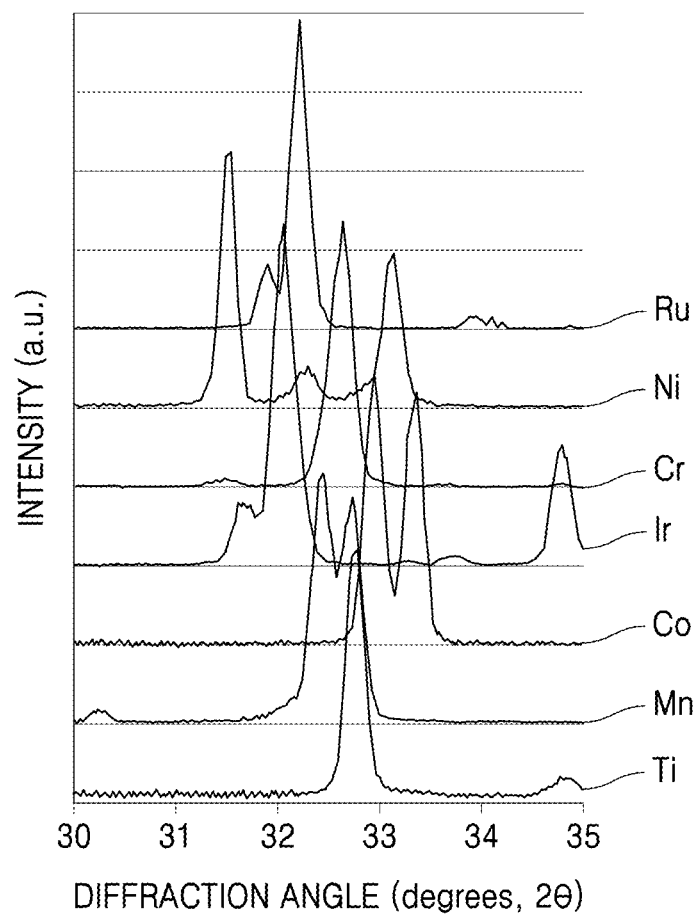
FIGS. 4A to 4C are graphs of intensity (arbitrary units, a.u.) versus diffraction angle (degrees two-theta (2θ), showing the results of X-ray diffraction (XRD) analysis of the perovskite materials prepared in Examples 1 to 6 and Comparative Example 1, respectively.
Figure 4B:
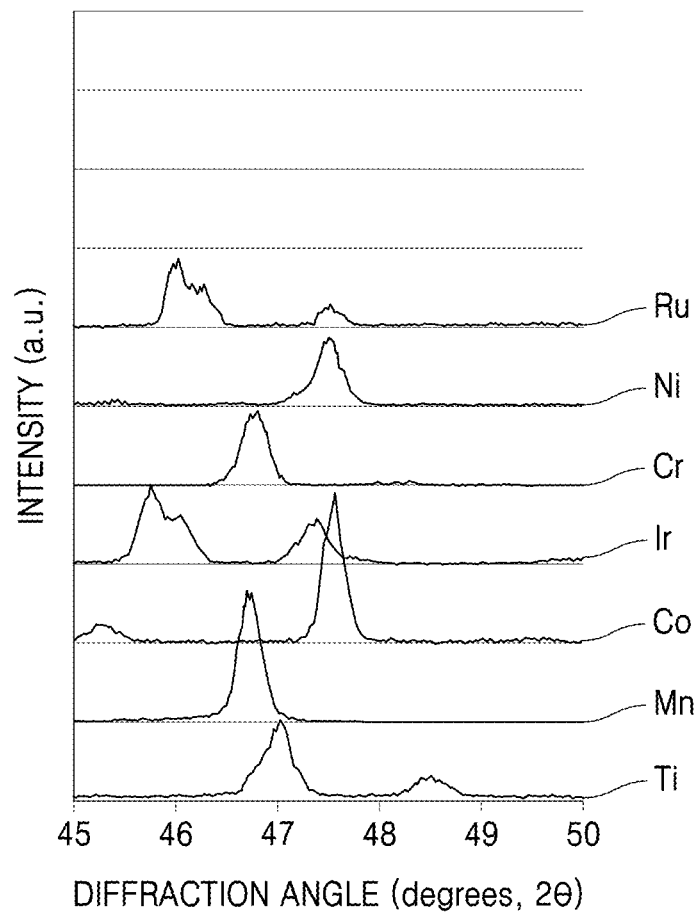
Figure 4C:
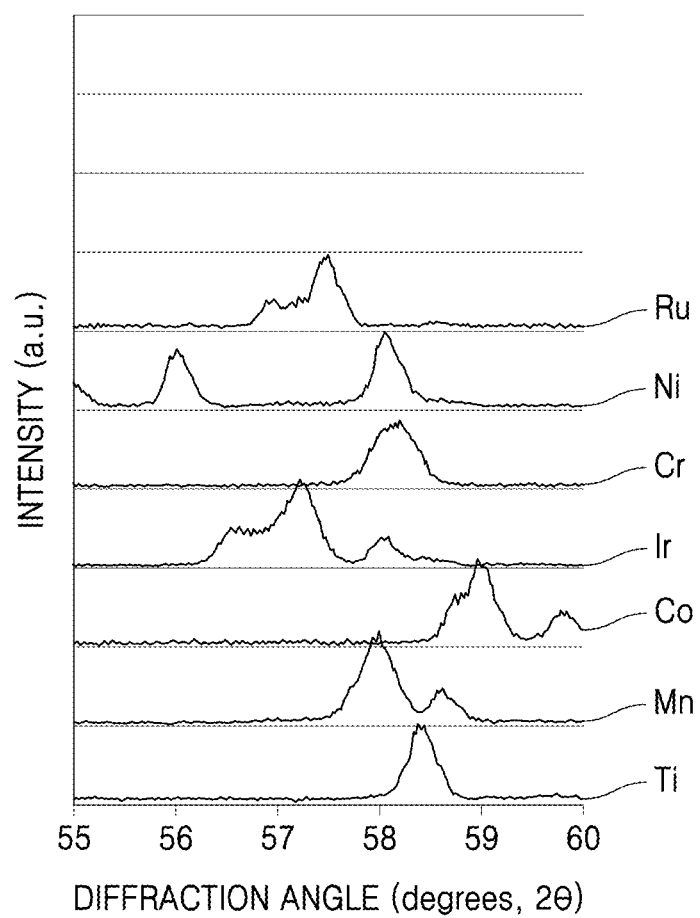

The perovskite materials of Examples 1 to 6 and Comparative Example 1 were analyzed by X-ray diffraction (XRD) analysis. The results of the X-ray diffraction analysis are shown in FIGS. 4A to 4C. In FIGS. 4A to 4C, Ti, Mn, Co, Ir, Cr, Ni, and Ru correspond to the elements present in the perovskite materials of Comparative Example 1, Example 2, Example 6, Example 5, Example 4, Example 3, and Example 1, respectively.

The XRD spectrometry was performed using a Bruker D8 Advance diffractometer with Cu Kα radiation. Based on the results of the XRD spectrometry on each of the perovskite materials, a ratio $(I_b/I_a)$ of a peak intensity $(I(46.5°±2.5°):I_b)$ at a diffraction angle 2θ of 46.5°±2.5° to a peak intensity $(I(32.5°±2.5°):I_a)$ at a diffraction angle 2θ of 32.5°±2.5°, and a ratio $(I_c/I_a)$ of a peak intensity $(I(57.5°±2.5°):I_c)$ at a diffraction angle 2θ of 57.5°±2.5° to a peak intensity $(I(32.5°±2.5°):I_a)$ at a diffraction angle 2θ of 32.5°±2.5° were calculated. The results are represented in Table 3.

TABLE 3

| Example | Intensity ratio $(I_b/I_a)$ | Intensity ratio $(I_c/I_a)$ |
|---|---|---|
| Comparative Example 1 ($Li_{0.34}La_{0.55}TiO_3$) | 0.3 | 0.3 |
| Example 1 ($Li_{0.34}La_{0.55}RuO_3$) | 0.2 | 0.2 |
| Example 2 ($Li_{0.34}La_{0.55}NiO_3$) | 0.3 | 0.3 |
| Example 3 ($Li_{0.34}La_{0.55}MnO_3$) | 0.5 | 0.4 |
| Example 4 ($Li_{0.34}La_{0.55}CrO_3$) | 0.3 | 0.3 |
| Example 5 ($Li_{0.34}La_{0.55}CoO_3$) | 0.6 | 0.3 |
| Example 6 ($Li_{0.34}La_{0.55}IrO_3$) | 0.2 | 0.3 |

Referring to Table 3 and FIGS. 4A to 4C, a peak at a diffraction angle of 11.3±0.5° appeared in the perovskite material of Comparative Example 1, but not in the perovskite materials of Examples 1 to 6. Without being limited by theory, it is understood that the perovskite material of Comparative Example 1 had separate La-poor and La-rich layers in the crystalline structure, while the perovskite materials of Examples 1 to 6 had a La layer which is not separated into La-poor and La-rich layers, as illustrated in FIG. 1, indicating that the perovskite materials of Examples 1 to 6 had a different crystalline structure from that of the perovskite material of Comparative Example 1.

Evaluation Example 2

Electronic Conductivity and Ionic Conductivity

Electronic conductivities and ionic conductivities of the perovskite materials of Examples 1 to 6 and Comparative Example 1 were measured. The results are represented in Table 4 and FIG. 5.

TABLE 4

| Example | Composition of perovskite material | Electronic conductivity (S/cm) | Ionic conductivity (S/cm) |
|---|---|---|---|
| Example 1 | $Li_{0.34}La_{0.55}RuO_3$ | $5.6 \times 10^{-2}$ | $2.1 \times 10^{-5}$ |
| Example 2 | $Li_{0.34}La_{0.55}NiO_3$ | $2.8 \times 10^{-2}$ | $3.0 \times 10^{-6}$ |
| Example 3 | $Li_{0.34}La_{0.55}MnO_3$ | $2.0 \times 10^{-3}$ | $8.8 \times 10^{-5}$ |
| Example 4 | $Li_{0.34}La_{0.55}CrO_3$ | $2.6 \times 10^{-4}$ | $2.0 \times 10^{-6}$ |
| Example 5 | $Li_{0.34}La_{0.55}CoO_3$ | $4.5 \times 10^{-4}$ | $4.6 \times 10^{-6}$ |
| Example 6 | $Li_{0.34}La_{0.55}IrO_3$ | $4.3 \times 10^{-3}$ | $1.7 \times 10^{-5}$ |
| Comparative Example 1 | $Li_{0.34}La_{0.55}TiO_3$ | $3.8 \times 10^{-9}$ | $1.2 \times 10^{-5}$ |

Figure 5:
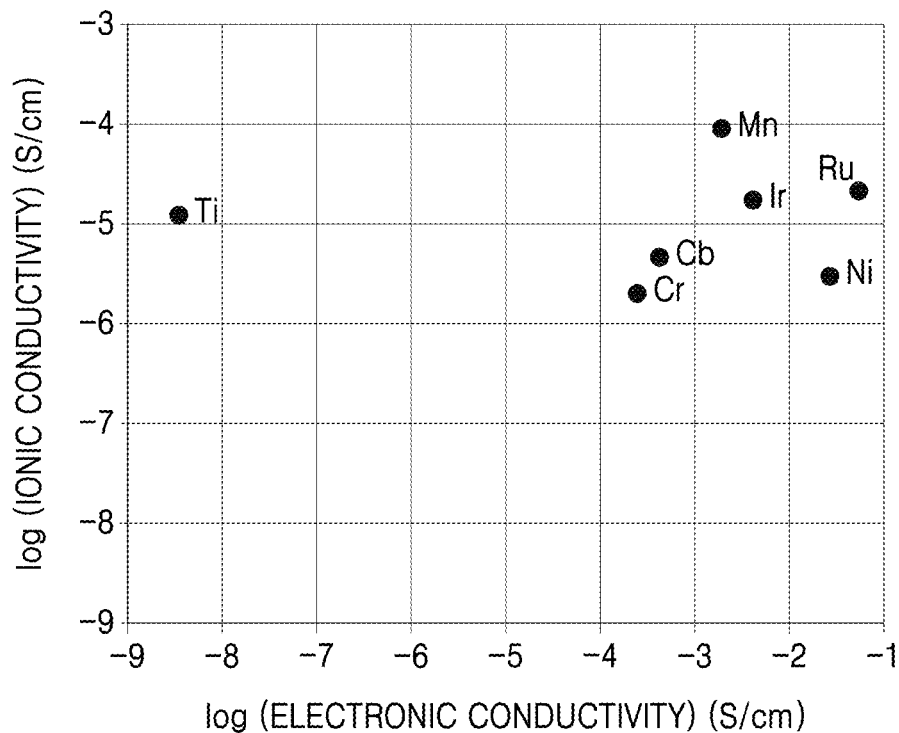
FIG. 5 is a graph of log ionic conductivity (Siemens per centimeter, S/cm) versus log electronic conductivity (S/cm), illustrating the relationship between the electronic conductivity and ionic conductivity of the perovskite materials prepared in Examples 1 to 6 and Comparative Example 1.

Referring to Table 4 and FIG. 5, the perovskite materials of Examples 1 to 6 were found to have satisfactory ionic conductivities, and remarkably improved electronic conductivities, as compared to the perovskite material of Comparative Example 1.

Evaluation Example 3

Evaluation of Charge and Discharge Characteristics

The lithium air batteries of Examples 7 and 8 and Comparative Example 2 were discharged with a constant current of 0.01 milliampere per square centimeter ($mA/cm^2$) under the conditions of about 60° C. and 1 atmosphere (atm) oxygen pressure until a voltage of 2.0 volts (V) with respect to Li was reached. The lithium-air battery was then charged with the same current until a voltage of 4.3 V was reached ($1^{st}$ charge and discharge cycle). Results of the charge and discharge test at the $1^{st}$ charge and discharge cycle are shown in FIG. 6.

Figure 6:
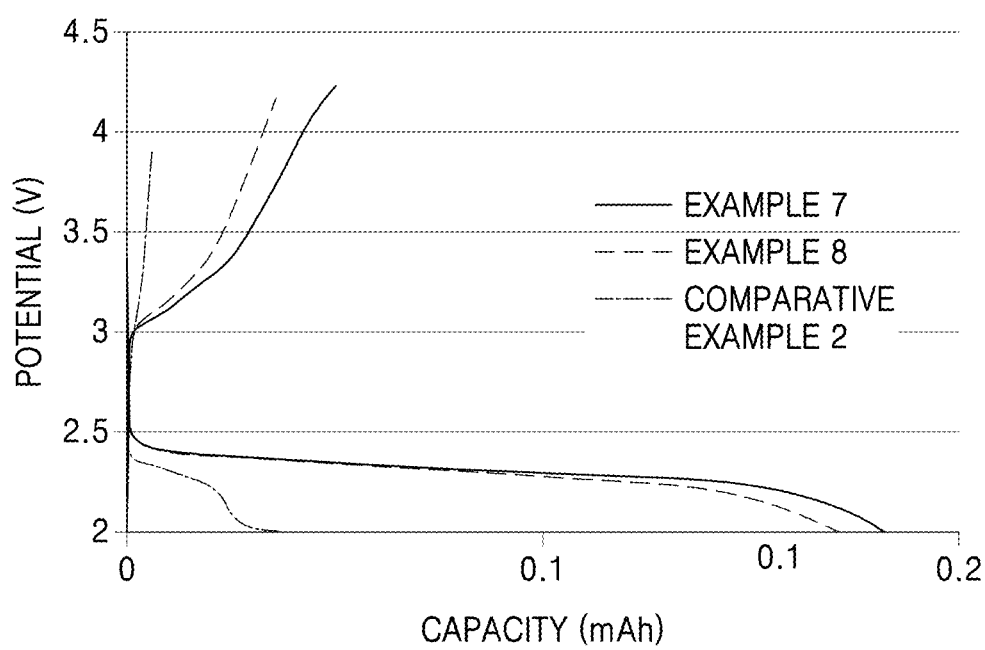
FIG. 6 is a graph of electric potential (volts, V) versus capacity (milliampere-hours, mAh), of the lithium air batteries manufactured in Examples 7 and 8 and Comparative Example 2.

Referring to FIG. 6, the lithium air batteries of Examples 7 and 8 were found to have improved charge and discharge characteristics, as compared with those of the lithium-air battery of Comparative Example 2.

Charge and discharge characteristics of the lithium air batteries of Example 9 and Example 10 were also evaluated in the same manner as applied to the lithium air batteries of Example 7 and Example 8. As a result of the charge and discharge characteristic evaluation, charge and discharge characteristics of the lithium air batteries of Examples 9 and 10 were found to be nearly similar to those of the lithium air batteries of Examples 7 and 8.

Evaluation Example 4

Electrochemical Stability Evaluation

After separately pulverizing the perovskite materials of Examples 1 and 3, 85% by weight of a pulverized product, 10% by weight of carbon black as a conducting agent, and 5% by weight of polyvinylidene fluoride (PVDF) as a binder were mixed together in N-methyl-2-pyrrolidone (NMP) used as a solvent to prepare a slurry. The slurry was coated on an aluminum foil and then dried to manufacture a working electrode. The working electrode and a lithium metal foil as a counter electrode were assembled together with a separator disposed between the working electrode and the counter electrode, the separator impregnated with a liquid electrolyte (1M LiTFSI in propylene carbonate (PC)), thereby completing manufacture of a half-cell.

Figure 7:
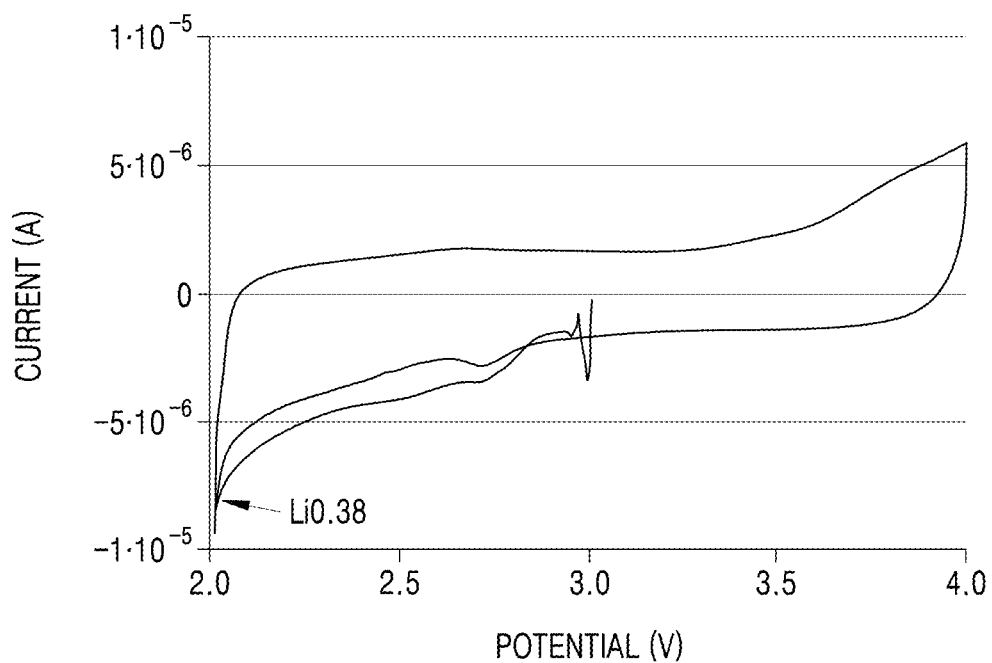
FIG. 7 is a cyclic voltammogram and is a graph of current (ampere, A) versus potential (V) for the perovskite material of Example 1.
Figure 8:
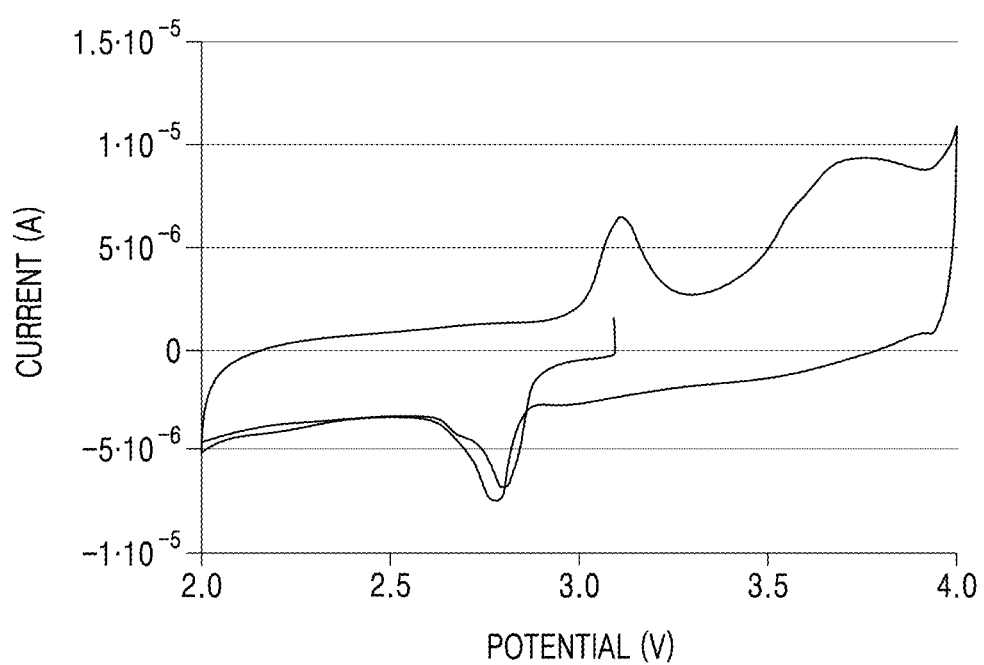
FIG. 8 is a cyclic voltammogram and is a graph of current (A) versus potential (V) for the perovskite material of Example 3.

Electrochemical stability of each of the perovskite materials, each coated on the lithium metal, was evaluated by cyclic voltammetry (CV) in which a voltage in a range of about 2 V to about 4 V (with respect to Li) was applied to the half-cell at a scanning rate of about 0.1 millivolts per second (mV/sec). The results are shown in FIGS. 7 and 8. FIGS. 7 and 8 are results of cyclic voltammetry on the perovskite materials of Example 1 and Example 3, respectively.

As shown in FIGS. 7 and 8, the perovskite materials of Examples 1 and 3 were found to be electrically stable, without resulting in an overcurrent caused by a side reaction.

As described above, according to the one or more embodiments, a secondary battery including a cathode containing the perovskite material according to any of the above-described embodiments may have improved charge and discharge characteristics.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A perovskite material represented by Formula 1:

$$Li_xA_yM_zO_3 \qquad \text{Formula 1}$$

wherein, in Formula 1, $0.1 \leq x \leq 1$, $0 \leq y \leq 1$, $0 < x+y < 1$, $0 \leq z \leq 1.5$, and $0 \leq \delta \leq 1$, A is La, Ce, Pr, Nd, Pm, Sm, Gd, Tb, Dy, Ho, Er, or a combination thereof, and M is Ni, Pd, Pb, Fe, Ir, Co, Rh, Mn, Cr, Ru, Re, Sn, V, Ge, W, Mo, Hf, U, Th, Bi, Li, H, Na, K, Rb, Cs, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof, wherein the perovskite material has a diffraction peak at a diffraction angle 2θ of 23.0°±2.5°, when analyzed by an X-ray diffraction using CuKα radiation.

2. The perovskite material of claim 1, wherein A and M in Formula 1 are different.

3. The perovskite material of claim 1, wherein A in Formula 1 is La, Ce, Pr, Gd, or a combination thereof, and M in Formula 1 is Mn, Ni, Ru, Cr, Co, Rb, Ir, Fe, Pd, Pb, Rh, Sn, V, Re, Ge, W, Mo, Hf, Bi, or a combination thereof.

4. The perovskite material of claim 1, wherein, in Formula 1, $0.2 < x \leq 0.5$, $0.2 < y \leq 0.7$, and $0.8 < z \leq 1.2$.

5. The perovskite material of claim 1, wherein in Formula 1, $0.3 < x \leq 0.4$, $0.4 < y \leq 0.7$, and $0.9 < z \leq 1.1$.

6. The perovskite material of claim 1, wherein in Formula 1, a ratio of x to y is about 1:0.5 to about 1:7.

7. The perovskite material of claim 1, wherein the perovskite material has an oxygen vacancy formation energy of 0 to less than 4 electron volts.

8. The perovskite material of claim 1, wherein the perovskite material represented by Formula 1 is a compound represented by Formula 2:

$$Li_xA1_yM1_zO_{3-\delta} \quad \text{Formula 2}$$

wherein, in Formula 2, $0.3 < x \le 1$, $0 < y \le 0.7$, $0 < z \le 1$, $0 < x+y < 1$, and $0 \le \delta \le 1$, A1 is La, Ce, Pr, Gd, or a combination thereof, and M1 is Mn, Ni, Ru, Cr, Co, Ru, Ir, Fe, Pd, Pb, Rh, Sn, V, Re, Ge, W, Mo, Hf, Bi, or a combination thereof.

9. The perovskite material of claim 1, wherein the perovskite material is $Li_{0.34}La_{0.55}MnO_3$, $Li_{0.34}La_{0.55}NiO_3$, $Li_{0.34}La_{0.55}CrO_3$, $Li_{0.34}La_{0.55}CoO_3$, $Li_{0.34}La_{0.55}IrO_3$, $Li_{0.34}La_{0.55}RuO_3$, $Li_{0.34}La_{0.55}FeO_3$, $Li_{0.34}La_{0.55}PdO_3$, $Li_{0.34}La_{0.55}PbO_3$, $Li_{0.34}La_{0.55}RhO_3$, $Li_{0.34}La_{0.55}SnO_3$, $Li_{0.34}La_{0.55}VO_3$, $Li_{0.34}La_{0.55}ReO_3$, $Li_{0.34}La_{0.55}GeO_3$, $Li_{0.34}La_{0.55}WO_3$, $Li_{0.34}La_{0.55}MoO_3$, $Li_{0.34}La_{0.55}HfO_3$, $Li_{0.34}La_{0.55}BiO_3$, $Li_{0.10}La_{0.63}MnO_3$, $Li_{0.10}La_{0.63}NiO_3$, $Li_{0.10}La_{0.63}CrO_3$, $Li_{0.10}La_{0.63}CoO_3$, $Li_{0.10}La_{0.63}IrO_3$, $Li_{0.10}La_{0.63}RuO_3$, $Li_{0.10}La_{0.63}FeO_3$, $Li_{0.10}La_{0.63}PdO_3$, $Li_{0.10}La_{0.63}PbO_3$, $Li_{0.10}La_{0.63}RhO_3$, $Li_{0.10}La_{0.63}SnO_3$, $Li_{0.10}La_{0.63}VO_3$, $Li_{0.10}La_{0.63}ReO_3$, $Li_{0.10}La_{0.63}GeO_3$, $Li_{0.10}La_{0.63}WO_3$, $Li_{0.10}La_{0.63}MoO_3$, $Li_{0.10}La_{0.63}HfO_3$, $Li_{0.10}La_{0.63}BiO_3$, $Li_{0.20}La_{0.60}MnO_3$, $Li_{0.20}La_{0.60}NiO_3$, $Li_{0.20}La_{0.60}CrO_3$, $Li_{0.20}La_{0.60}CoO_3$, $Li_{0.20}La_{0.60}IrO_3$, $Li_{0.20}La_{0.60}RuO_3$, $Li_{0.20}La_{0.60}FeO_3$, $Li_{0.20}La_{0.60}PdO_3$, $Li_{0.20}La_{0.60}PbO_3$, $Li_{0.20}La_{0.60}RhO_3$, $Li_{0.20}La_{0.60}SnO_3$, $Li_{0.20}La_{0.60}VO_3$, $Li_{0.20}La_{0.60}ReO_3$, $Li_{0.20}La_{0.60}GeO_3$, $Li_{0.20}La_{0.60}WO_3$, $Li_{0.20}La_{0.60}MoO_3$, $Li_{0.20}La_{0.60}HfO_3$, $Li_{0.20}La_{0.60}BiO_3$, $Li_{0.30}La_{0.57}MnO_3$, $Li_{0.30}La_{0.57}NiO_3$, $Li_{0.30}La_{0.57}CrO_3$, $Li_{0.30}La_{0.57}CoO_3$, $Li_{0.30}La_{0.57}IrO_3$, $Li_{0.30}La_{0.57}RuO_3$, $Li_{0.30}La_{0.57}FeO_3$, $Li_{0.30}La_{0.57}PdO_3$, $Li_{0.30}La_{0.57}PbO_3$, $Li_{0.30}La_{0.57}RhO_3$, $Li_{0.30}La_{0.57}SnO_3$, $Li_{0.30}La_{0.57}VO_3$, $Li_{0.30}La_{0.57}ReO_3$, $Li_{0.30}La_{0.57}GeO_3$, $Li_{0.30}La_{0.57}WO_3$, $Li_{0.30}La_{0.57}MoO_3$, $Li_{0.30}La_{0.57}HfO_3$, $Li_{0.30}La_{0.57}BiO_3$, $Li_{0.40}La_{0.53}MnO_3$, $Li_{0.40}La_{0.53}NiO_3$, $Li_{0.40}La_{0.53}CrO_3$, $Li_{0.40}La_{0.53}CoO_3$, $Li_{0.40}La_{0.53}IrO_3$, $Li_{0.40}La_{0.53}RuO_3$, $Li_{0.40}La_{0.53}FeO_3$, $Li_{0.40}La_{0.53}PdO_3$, $Li_{0.40}La_{0.53}PbO_3$, $Li_{0.40}La_{0.53}RhO_3$, $Li_{0.40}La_{0.53}SnO_3$, $Li_{0.40}La_{0.53}VO_3$, $Li_{0.40}La_{0.53}ReO_3$, $Li_{0.40}La_{0.53}GeO_3$, $Li_{0.40}La_{0.53}WO_3$, $Li_{0.40}La_{0.53}MoO_3$, $Li_{0.40}La_{0.53}HfO_3$, $Li_{0.40}La_{0.53}BiO_3$, $Li_{0.45}La_{0.52}MnO_3$, $Li_{0.45}La_{0.52}NiO_3$, $Li_{0.45}La_{0.52}CrO_3$, $Li_{0.45}La_{0.52}CoO_3$, $Li_{0.45}La_{0.52}IrO_3$, $Li_{0.45}La_{0.52}RuO_3$, $Li_{0.45}La_{0.52}FeO_3$, $Li_{0.45}La_{0.52}PdO_3$, $Li_{0.45}La_{0.52}PbO_3$, $Li_{0.45}La_{0.52}RhO_3$, $Li_{0.45}La_{0.52}SnO_3$, $Li_{0.45}La_{0.52}VO_3$, $Li_{0.45}La_{0.52}ReO_3$, $Li_{0.45}La_{0.52}GeO_3$, $Li_{0.45}La_{0.52}WO_3$, $Li_{0.45}La_{0.52}MoO_3$, $Li_{0.45}La_{0.52}HfO_3$, $Li_{0.45}La_{0.52}BiO_3$, $Li_{0.34}Ce_{0.55}MnO_3$, $Li_{0.34}Ce_{0.55}NiO_3$, $Li_{0.34}Ce_{0.55}CrO_3$, $Li_{0.34}Ce_{0.55}CoO_3$, $Li_{0.34}Ce_{0.55}IrO_3$, $Li_{0.34}Ce_{0.55}RuO_3$, $Li_{0.34}Ce_{0.55}FeO_3$, $Li_{0.34}Ce_{0.55}PdO_3$, $Li_{0.34}Ce_{0.55}PbO_3$, $Li_{0.34}Ce_{0.55}RhO_3$, $Li_{0.34}Ce_{0.55}SnO_3$, $Li_{0.34}Ce_{0.55}VO_3$, $Li_{0.34}Ce_{0.55}ReO_3$, $Li_{0.34}Ce_{0.55}GeO_3$, $Li_{0.34}Ce_{0.55}$ $O_3$, $Li_{0.34}Ce_{0.55}MoO_3$, $Li_{0.34}Ce_{0.55}HfO_3$, $Li_{0.34}Ce_{0.55}BiO_3$, $Li_{0.10}Ce_{0.63}MnO_3$, $Li_{0.10}Ce_{0.63}NiO_3$, $Li_{0.10}Ce_{0.63}CrO_3$, $Li_{0.10}Ce_{0.63}CoO_3$, $Li_{0.10}Ce_{0.63}IrO_3$, $Li_{0.10}Ce_{0.63}RuO_3$, $Li_{0.10}Ce_{0.63}FeO_3$, $Li_{0.10}Ce_{0.63}PdO_3$, $Li_{0.10}Ce_{0.63}PbO_3$, $Li_{0.10}Ce_{0.63}RhO_3$, $Li_{0.10}Ce_{0.63}SnO_3$, $Li_{0.10}Ce_{0.63}VO_3$, $Li_{0.10}Ce_{0.63}ReO_3$, $Li_{0.10}Ce_{0.63}GeO_3$, $Li_{0.10}Ce_{0.63}WO_3$, $Li_{0.10}Ce_{0.63}MoO_3$, $Li_{0.10}Ce_{0.63}HfO_3$, $Li_{0.10}Ce_{0.63}BiO_3$, $Li_{0.20}Ce_{0.60}MnO_3$, $Li_{0.20}Ce_{0.60}NiO_3$, $Li_{0.20}Ce_{0.60}CrO_3$, $Li_{0.20}Ce_{0.60}CoO_3$, $Li_{0.20}Ce_{0.60}IrO_3$, $Li_{0.20}Ce_{0.60}RuO_3$, $Li_{0.20}Ce_{0.60}FeO_3$, $Li_{0.20}Ce_{0.60}PdO_3$, $Li_{0.20}Ce_{0.60}PbO_3$, $Li_{0.20}Ce_{0.60}RhO_3$, $Li_{0.20}Ce_{0.60}SnO_3$, $Li_{0.20}Ce_{0.60}VO_3$, $Li_{0.20}Ce_{0.60}ReO_3$, $Li_{0.20}Ce_{0.60}GeO_3$, $Li_{0.20}Ce_{0.60}WO_3$, $Li_{0.20}Ce_{0.60}MoO_3$, $Li_{0.20}Ce_{0.60}HfO_3$, $Li_{0.20}Ce_{0.60}BiO_3$, $Li_{0.30}Ce_{0.57}MnO_3$, $Li_{0.30}Ce_{0.57}NiO_3$, $Li_{0.30}Ce_{0.57}CrO_3$, $Li_{0.30}Ce_{0.57}CoO_3$, $Li_{0.30}Ce_{0.57}IrO_3$, $Li_{0.30}Ce_{0.57}RuO_3$, $Li_{0.30}Ce_{0.57}FeO_3$, $Li_{0.30}Ce_{0.57}PdO_3$, $Li_{0.30}Ce_{0.57}PbO_3$, $Li_{0.30}Ce_{0.57}RhO_3$, $Li_{0.30}Ce_{0.57}SnO_3$, $Li_{0.30}Ce_{0.57}VO_3$, $Li_{0.30}Ce_{0.57}ReO_3$, $Li_{0.30}Ce_{0.57}GeO_3$, $Li_{0.30}Ce_{0.57}VO_3$, $Li_{0.30}Ce_{0.57}MoO_3$, $Li_{0.30}Ce_{0.57}HfO_3$, $Li_{0.30}Ce_{0.57}BiO_3$, $Li_{0.40}Ce_{0.53}MnO_3$, $Li_{0.40}Ce_{0.53}NiO_3$, $Li_{0.40}Ce_{0.53}CrO_3$, $Li_{0.40}Ce_{0.53}CoO_3$, $Li_{0.40}Ce_{0.53}IrO_3$, $Li_{0.40}Ce_{0.53}RuO_3$, $Li_{0.40}Ce_{0.53}FeO_3$, $Li_{0.40}Ce_{0.53}PdO_3$, $Li_{0.40}Ce_{0.53}PbO_3$, $Li_{0.40}Ce_{0.53}RhO_3$, $Li_{0.40}Ce_{0.53}SnO_3$, $Li_{0.40}Ce_{0.53}VO_3$, $Li_{0.40}Ce_{0.53}ReO_3$, $Li_{0.40}Ce_{0.53}GeO_3$, $Li_{0.40}Ce_{0.53}WO_3$, $Li_{0.40}Ce_{0.53}MoO_3$, $Li_{0.40}Ce_{0.53}HfO_3$, $Li_{0.40}Ce_{0.53}BiO_3$, $Li_{0.45}Ce_{0.52}MnO_3$, $Li_{0.45}Ce_{0.52}NiO_3$, $Li_{0.45}Ce_{0.52}CrO_3$, $Li_{0.45}Ce_{0.52}CoO_3$, $Li_{0.45}Ce_{0.52}IrO_3$, $Li_{0.45}Ce_{0.52}RuO_3$, $Li_{0.45}Ce_{0.52}FeO_3$, $Li_{0.45}Ce_{0.52}PdO_3$, $Li_{0.45}Ce_{0.52}PbO_3$, $Li_{0.45}Ce_{0.52}RhO_3$, $Li_{0.45}Ce_{0.52}SnO_3$, $Li_{0.45}Ce_{0.52}VO_3$, $Li_{0.45}Ce_{0.52}ReO_3$, $Li_{0.45}Ce_{0.52}GeO_3$, $Li_{0.45}Ce_{0.52}WO_3$, $Li_{0.45}Ce_{0.52}MoO_3$, $Li_{0.45}Ce_{0.52}HfO_3$, $Li_{0.45}Ce_{0.52}BiO_3$, $Li_{0.34}Pr_{0.55}MnO_3$, $Li_{0.34}Pr_{0.55}NiO_3$, $Li_{0.34}Pr_{0.55}CrO_3$, $Li_{0.34}Pr_{0.55}CoO_3$, $Li_{0.34}Pr_{0.55}IrO_3$, $Li_{0.34}Pr_{0.55}RuO_3$, $Li_{0.34}Pr_{0.55}FeO_3$, $Li_{0.34}Pr_{0.55}PdO_3$, $Li_{0.34}Pr_{0.55}PbO_3$, $Li_{0.34}Pr_{0.55}RhO_3$, $Li_{0.34}Pr_{0.55}SnO_3$, $Li_{0.34}Pr_{0.55}VO_3$, $Li_{0.34}Pr_{0.55}ReO_3$, $Li_{0.34}Pr_{0.55}GeO_3$, $Li_{0.34}Pr_{0.55}$ $O_3$, $Li_{0.34}Pr_{0.55}MoO_3$, $Li_{0.34}Pr_{0.55}HfO_3$, $Li_{0.34}Pr_{0.55}BiO_3$, $Li_{0.10}Pr_{0.63}MnO_3$, $Li_{0.10}Pr_{0.63}NiO_3$, $Li_{0.10}Pr_{0.63}CrO_3$, $Li_{0.10}Pr_{0.63}CoO_3$, $Li_{0.10}Pr_{0.63}IrO_3$, $Li_{0.10}Pr_{0.63}RuO_3$, $Li_{0.10}Pr_{0.63}FeO_3$, $Li_{0.10}Pr_{0.63}PdO_3$, $Li_{0.10}Pr_{0.63}PbO_3$, $Li_{0.10}Pr_{0.63}RhO_3$, $Li_{0.10}Pr_{0.63}SnO_3$, $Li_{0.10}Pr_{0.63}VO_3$, $Li_{0.10}Pr_{0.63}ReO_3$, $Li_{0.10}Pr_{0.63}GeO_3$, $Li_{0.10}Pr_{0.63}WO_3$, $Li_{0.10}Pr_{0.63}MoO_3$, $Li_{0.10}Pr_{0.63}HfO_3$, $Li_{0.10}Pr_{0.63}BiO_3$, $Li_{0.20}Pr_{0.60}MnO_3$, $Li_{0.20}Pr_{0.60}NiO_3$, $Li_{0.20}Pr_{0.60}CrO_3$, $Li_{0.20}Pr_{0.60}CoO_3$, $Li_{0.20}Pr_{0.60}IrO_3$, $Li_{0.20}Pr_{0.60}RuO_3$, $Li_{0.20}Pr_{0.60}FeO_3$, $Li_{0.20}Pr_{0.60}PdO_3$, $Li_{0.20}Pr_{0.60}PbO_3$, $Li_{0.20}Pr_{0.60}RhO_3$, $Li_{0.20}Pr_{0.60}SnO_3$, $Li_{0.20}Pr_{0.60}VO_3$, $Li_{0.20}Pr_{0.60}ReO_3$, $Li_{0.20}Pr_{0.60}GeO_3$, $Li_{0.20}Pr_{0.60}WO_3$, $Li_{0.20}Pr_{0.60}MoO_3$, $Li_{0.20}Pr_{0.60}HfO_3$, $Li_{0.20}Pr_{0.60}BiO_3$, $Li_{0.30}Pr_{0.57}MnO_3$, $Li_{0.30}Pr_{0.57}NiO_3$, $Li_{0.30}Pr_{0.57}CrO_3$, $Li_{0.30}Pr_{0.57}CoO_3$, $Li_{0.30}Pr_{0.57}IrO_3$, $Li_{0.30}Pr_{0.57}RuO_3$, $Li_{0.30}Pr_{0.57}FeO_3$, $Li_{0.30}Pr_{0.57}PdO_3$, $Li_{0.30}Pr_{0.57}PbO_3$, $Li_{0.30}Pr_{0.57}RhO_3$, $Li_{0.30}Pr_{0.57}SnO_3$, $Li_{0.30}Pr_{0.57}VO_3$, $Li_{0.30}Pr_{0.57}ReO_3$, $Li_{0.30}Pr_{0.57}GeO_3$, $Li_{0.30}Pr_{0.57}WO_3$, $Li_{0.30}Pr_{0.57}MoO_3$, $Li_{0.30}Pr_{0.57}HfO_3$, $Li_{0.30}Pr_{0.57}BiO_3$, $Li_{0.40}Pr_{0.53}MnO_3$, $Li_{0.40}Pr_{0.53}NiO_3$, $Li_{0.40}Pr_{0.53}CrO_3$, $Li_{0.40}Pr_{0.53}CoO_3$, $Li_{0.40}Pr_{0.53}IrO_3$, $Li_{0.40}Pr_{0.53}RuO_3$, $Li_{0.40}Pr_{0.53}FeO_3$, $Li_{0.40}Pr_{0.53}PdO_3$, $Li_{0.40}Pr_{0.53}PbO_3$, $Li_{0.40}Pr_{0.53}RhO_3$, $Li_{0.40}Pr_{0.53}SnO_3$, $Li_{0.40}Pr_{0.53}VO_3$, $Li_{0.40}Pr_{0.53}ReO_3$, $Li_{0.40}Pr_{0.53}GeO_3$, $Li_{0.40}Pr_{0.53}WO_3$, $Li_{0.40}Pr_{0.53}MoO_3$, $Li_{0.40}Pr_{0.53}HfO_3$, $Li_{0.40}Pr_{0.53}BiO_3$, $Li_{0.45}Pr_{0.52}MnO_3$, $Li_{0.45}Pr_{0.52}NiO_3$, $Li_{0.45}Pr_{0.52}CrO_3$, $Li_{0.45}Pr_{0.52}CoO_3$, $Li_{0.45}Pr_{0.52}IrO_3$, $Li_{0.45}Pr_{0.52}RuO_3$, $Li_{0.45}Pr_{0.52}FeO_3$, $Li_{0.45}Pr_{0.52}PdO_3$, $Li_{0.45}Pr_{0.52}PbO_3$, $Li_{0.45}Pr_{0.52}RhO_3$, $Li_{0.45}Pr_{0.52}SnO_3$, $Li_{0.45}Pr_{0.52}VO_3$, $Li_{0.45}Pr_{0.52}ReO_3$, $Li_{0.45}Pr_{0.52}GeO_3$, $Li_{0.45}Pr_{0.52}WO_3$, $Li_{0.45}Pr_{0.52}MoO_3$, $Li_{0.45}Pr_{0.52}HfO_3$, $Li_{0.45}Pr_{0.52}BiO_3$, $Li_{0.25}La_{0.50}MnO_3$, $Li_{0.25}La_{0.50}NiO_3$, $Li_{0.25}La_{0.50}CrO_3$, $Li_{0.25}La_{0.50}CoO_3$, $Li_{0.25}La_{0.50}IrO_3$, $Li_{0.25}La_{0.50}RuO_3$, $Li_{0.25}La_{0.50}FeO_3$, $Li_{0.25}La_{0.50}PdO_3$, $Li_{0.25}La_{0.50}PbO_3$, $Li_{0.25}La_{0.50}RhO_3$, $Li_{0.25}La_{0.50}SnO_3$, $Li_{0.25}La_{0.50}VO_3$, $Li_{0.25}La_{0.50}ReO_3$, $Li_{0.25}La_{0.50}GeO_3$, $Li_{0.25}La_{0.50}WO_3$, $Li_{0.25}La_{0.50}MoO_3$, $Li_{0.25}La_{0.50}HfO_3$, $Li_{0.25}La_{0.50}BiO_3$,
$Li_{0.10}La_{0.50}Mn_{0.70}O_3$, $Li_{0.20}La_{0.77}Mn_{0.70}O_3$,
$Li_{0.10}La_{0.50}V_{0.70}O_3$, $Li_{0.20}La_{0.77}V_{0.70}O_3$,
$Li_{0.10}La_{0.50}W_{0.70}O_3$, $Li_{0.20}La_{0.77}W_{0.70}O_3$,
$Li_{0.10}La_{0.50}Mo_{0.70}O_3$, $Li_{0.20}La_{0.77}Mo_{0.70}O_3$,
$Li_{0.10}La_{0.50}Bi_{0.70}O_3$, $Li_{0.20}La_{0.77}Bi_{0.70}O_3$,
$Li_{0.10}La_{0.50}Cr_{0.70}O_3$, $Li_{0.20}La_{0.77}Cr_{0.70}O_3$, or a combination thereof.

10. The perovskite material of claim 1, wherein the perovskite material is $Li_{0.34}La_{0.55}RuO_{3-\delta}$ wherein $0 \le \delta \le 1$, $Li_{0.34}La_{0.55}MnO_{3-\delta}$ wherein $0 \le \delta \le 1$, $Li_{0.34}La_{0.55}NiO_{3-\delta}$ wherein $0 \le \delta \le 1$, $Li_{0.34}La_{0.55}CrO_{3-\delta}$ wherein $0 \le \delta \le 1$, $Li_{0.34}La_{0.55}IrO_{3-\delta}$ wherein $0 \le \delta \le 1$, $Li_{0.34}La_{0.55}CoO_{3-\delta}$ wherein $0 \le \delta \le 1$, or a combination thereof.

11. The perovskite material of claim 1, wherein the perovskite material has a ratio of a peak intensity at a diffraction angle $2\theta$ of $46.5° \pm 2.5°$ to a peak intensity at a diffraction angle $2\theta$ of $32.5° \pm 2.5°$ of less than 1.

12. The perovskite material of claim 1, wherein the perovskite material has a ratio of a peak intensity at a diffraction angle $2\theta$ of $57.5° \pm 2.5°$ to a peak intensity at a diffraction angle $2\theta$ of $32.5° \pm 2.5°$ of less than 1.

13. The perovskite material of claim 1, wherein the perovskite material has an electronic conductivity of about $1 \times 10^{-6}$ Siemens per centimeter or greater and an ionic conductivity of about $2 \times 10^{-6}$ Siemens per centimeter or greater.

14. The perovskite material of claim 1, wherein the perovskite material of Formula 1 comprises lithium and a vacancy on an A site of the perovskite structure, oxygen defects, and
wherein the perovskite material of Formula 1 has an orthorhombic, cubic, monoclinic, or triclinic crystal structure.

15. A method of preparing the perovskite material of claim 1, the method comprising:
providing a mixture comprising a lithium compound, an A element-containing compound, an M element-containing compound, and a solvent;
first thermally treating the mixture to form a first thermally treated mixture;
pulverizing the first thermally treated mixture to obtain a formed product; and
second thermally treating the formed product to form the perovskite material,
wherein a temperature of the second thermally treating is greater than a temperature of the first thermally treating,
wherein A of the A element-containing compound is La, Ce, Pr, Nd, Pm, Sm, Gd, Tb, Dy, Ho, Er, or a combination thereof, and
M of the M element-containing compound is Ni, Pd, Pb, Fe, Ir, Co, Rh, Mn, Cr, Ru, Re, Sn, V, Ge, W, Mo, Hf, U, Th, Bi, Li, H, Na, K, Rb, Cs, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof.

16. The method of claim 15, wherein A of the A element-containing compound and M of the M element-containing compound are different.

17. The method of claim 15, wherein the first thermally treating is performed at a temperature of about 600° C. to about 900° C.

18. The method of claim 15, wherein the second thermally treating is performed at a temperature of about 900° C. to about 1500° C.

19. The method of claim 15, wherein the perovskite material has a particle size of about 100 micrometers or less.

20. The method of claim 15, wherein the solvent is at least one of ethanol, water, ethylene glycol, or isopropanol.

21. The method of claim 15, wherein the lithium compound is at least one of lithium oxide, lithium carbonate, lithium chloride, lithium sulfide, lithium nitrate, lithium phosphate, or lithium hydroxide.

22. The method of claim 15, wherein the A element-containing compound is at least one of lanthanum oxide, lanthanum carbonate, lanthanum chloride, lanthanum sulfide, lanthanum nitrate, lanthanum phosphate, lanthanum hydroxide, cerium oxide, cerium carbonate, cerium chloride, cerium sulfide, cerium nitrate, cerium phosphate, or cerium hydroxide.

23. The method of claim 15, wherein the M element-containing compound is at least one of nickel oxide, nickel hydroxide, cobalt oxide, cobalt hydroxide, ruthenium oxide, ruthenium hydroxide, chromium oxide, chromium hydroxide, iridium oxide, iridium hydroxide, manganese oxide, or manganese hydroxide.

24. The method of claim 15, further comprising pressing the formed product to form pellets before the second thermally treating.

25. A secondary battery comprising the perovskite material of claim 1.

26. The secondary battery of claim 25, wherein the secondary battery comprises:
a cathode;
an anode; and
a gas-blocking layer interposed between the cathode and the anode,
wherein the cathode or each of the cathode and the gas-blocking layer comprise the perovskite material.

27. A composite perovskite material represented by Formula 3, and having a ratio of a peak intensity at a diffraction angle $2\theta$ of $46.5° \pm 2.5°$ to a peak intensity at a diffraction angle $2\theta$ of $32.5° \pm 2.5°$ of less than 1:

$$Li_xA_yM_zO_{3-\delta} \quad \text{Formula 3}$$

wherein, in Formula 3, $0.1 \le x \le 1$, $0 < y \le 1$, $0 < x+y < 1$, $0 < z \le 1.5$, and $0 \le \delta \le 1$,
A is H, Na, K, Rb, Cs, Sr, Ba, Y, La, Ce, Pr, Nd, Pm, Sm, Gd, Tb, Dy, Ho, Er, or a combination thereof, and
M is Ni, Pd, Pb, Fe, Ir, Co, Rh, Mn, Cr, Ru, Re, Sn, V, Ge, W, Mo, Hf, U, Th, Bi, Li, H, Na, K, Rb, Cs, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof.

28. The perovskite material of claim 27, wherein the perovskite material has a ratio of a peak intensity at a diffraction angle $2\theta$ of $57.5° \pm 2.5°$ to a peak intensity at a diffraction angle $2\theta$ of $32.5° \pm 2.5°$ of less than 1.

29. A secondary battery comprising the perovskite material of claim 27.

30. The secondary battery of claim 29, wherein the secondary battery comprises:
a cathode;
an anode; and
an electrolyte interposed between the cathode and the anode,
wherein the cathode or each the cathode and the electrolyte comprise the perovskite material.

31. A perovskite material represented by Formula 1:

$$Li_xA_yM_zO_{3-\delta} \quad \text{Formula 1}$$

wherein, in Formula 1, $0.1 \le x \le 1$, $0 < y \le 1$, $0 < x+y < 1$, $0 < z \le 1.5$, and $0 \le \delta \le 1$, A is La, and M is Ni, Pd, Pb, Fe, Ir, Co, Rh, Mn, Cr, Ru, Re, Sn, V, Ge, W, Mo, Hf, U, Th, Bi, Li, H, Na, K, Rb, Cs, Ba, Y, La, Ce, Pr, Nd, Pm, Sm, Gd, Tb, Dy, Ho, Er, Mg, Al, Si, Sc, Zn, Ga, Ag, Cd, In, Sb, Pt, Au, or a combination thereof, wherein the perovskite material has a diffraction peak at a diffraction angle $2\theta$ of $23.0°\pm2.5°$, when analyzed by an X-ray diffraction using CuK$\alpha$ radiation.

* * * * *